United States Patent
Tokairin et al.

(12) 
(10) Patent No.: US 6,229,593 B1
(45) Date of Patent: May 8, 2001

(54) EXPOSURE DEVICE

(75) Inventors: Motohiro Tokairin; Tamotsu Nishiura, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/223,267

(22) Filed: Dec. 30, 1998

(30) Foreign Application Priority Data

Feb. 3, 1998 (JP) .................................................. 10-022358

(51) Int. Cl.[7] ........................ G03B 27/52; G03B 15/043; G03G 15/043; B41J 2/385; B41J 2/435; B41J 2/45

(52) U.S. Cl. ........................ 355/41; 399/51; 347/130; 347/237; 347/238; 347/247; 347/249

(58) Field of Search ................................ 355/41; 399/51; 347/130, 237, 238, 247, 249

(56) References Cited

U.S. PATENT DOCUMENTS

| | | | | |
|---|---|---|---|---|
| 5,138,337 | * | 8/1992 | Ng ........................ | 346/107 |
| 5,754,216 | * | 5/1998 | Higuchi et al. ........................ | 347/238 |
| 5,926,201 | * | 7/1999 | Fleming et al. ........................ | 347/237 |
| 6,002,420 | * | 12/1999 | Tanioka et al. ........................ | 347/237 |
| 6,025,858 | * | 2/2000 | Tanioka et al. ........................ | 347/129 |

FOREIGN PATENT DOCUMENTS

| | | |
|---|---|---|
| 0 435 520 A2 | 7/1991 | (EP) . |
| 58-48562 | 3/1983 | (JP) . |
| 7-89132 | 4/1995 | (JP) . |

* cited by examiner

*Primary Examiner*—Russell Adams
*Assistant Examiner*—Khaled Brown
(74) *Attorney, Agent, or Firm*—Armstrong, Westerman, Hattori, McLeland & Naughton, LLP

(57) ABSTRACT

The present invention provides an exposure device capable of operating at a high speed and obtaining an excellent printing result. The exposure device according to the present invention includes optical write heads using shift registers of two systems, and a circuit that supplies image data for one line divided into the first half and the second half to the respective shift registers. The circuit is consist of a write control section, a memory, a read control section and a transfer control section), and receives data of twice the number of bits of data inputted to the shift register.

8 Claims, 23 Drawing Sheets

EXPOSURE DEVICE

BACKGROUND OF THE INVENTION

1. Field of the Invention

The present invention relates an exposure device for use in a printer, a facsimile, a copying machine, etc.

2. Description of the Related Art

There has been known an image forming device such as a printer in which a latent image is formed on a surface of a photosensitive body and then developed with a developer, an image developed by the developer is transferred to a sheet, and a transferred image is fixed onto the sheet by a fixing unit.

FIG. 23 shows the structure of a conventional optical write head. As shown in the figure, the conventional optical write head includes a shift register 11 to which parallel data DATA00–15 of 16 bits, a shift clock CLK and a start signal DSTAR are inputted, a register 12 to which the output of the shift register 11 and a latch signal LST are inputted, and a large number of LEDs (Light-Emitting Diodes) 13 aligned so as to conduct exposure for one line. The optical write head also includes switching elements 14 for controlling the on/off of the LEDs 13 and AND circuits 15 for controlling a logical product of the output of the register 12 and a drive signal DST to the switching elements 14 as a control signal.

In exposing for one line, the start signal DSTR is first inputted to the optical write head. And then, in synchronism with the shift clock CLK, image data as the parallel data DATA00 to 15 for one line is inputted to the optical write head 16 bits by 16 bits. Thereafter, on the completion of the supply of the image data for one line, the latch signal LST and the drive signal DST are inputted to the optical write head.

On inputting the start signal DSTR, the shift register 11 starts to take the parallel data DATA00–15, and shifts data stored in the shift register 11 while taking new parallel data DATA00–15 every time the shift clock CLK is inputted to the shift register 11. On inputting the latch signal LST, the register 12 latches data for one line which is outputted from the shift register 11 to output the data. The AND circuits 15 to which the output of the shift register 11 is inputted, supplies a signal identical in level with a signal outputted from the shift register 11 to the switching element 14, when the drive signal DST is inputted to the AND circuits 15. Accordingly, only the LED 13 corresponding to the bit to which the shift register 11 outputs a high signal emits a light. Then, this state is maintained for a predetermined time so that exposure for one line is conducted in correspondence to the inputted image data. Thereafter the supply of image data relating to a succeeding line is conducted in the same procedure in order to make exposure for the succeeding line.

However, in the case of manufacturing an optical write head with the structure, shown in FIG. 23, including the large number of LEDs structures one line, a time proportional to the number of LEDs is required for setting data for one line.

For that reason, in order to reduce a time required for setting data for one line, there has been proposed an optical write head in which the optical write head (the shift register and the LEDs) is divided into plural groups and in which data is transferred in a parallel manner to the shift register belonging to each of those groups. For example, Japanese Patent Unexamined Publication Sho 58-48562 discloses an optical write head in which LEDs are divided into a plurality of groups, and plural circuits for driving the LEDs are provided in each group. As to thus structured optical writing head, an excellent printing result cannot be obtained because a light emission timing disperses although data setting is made at a high speed.

SUMMARY OF THE INVENTION

The present invention has been made in order to solve the above problems, and therefore an object of the present invention is to provide an exposure device which is capable of operating at a high speed and obtaining an excellent printing result.

In order to solve the above problems, according to the present invention, there is provided an exposure device comprising a light emitting element array including (N×M) numbers of light emitting elements disposed linearly, M numbers of data holding and outputting means for holding and outputting N numbers of pixel data, the M numbers of data holding and outputting means being adapted to shift the pixel data held therein and take supplied pixel data when the other pixel data is supplied to the M numbers of pixel data holding and outputting means, driving means for driving the (N×M) numbers of light emitting elements in the light emitting element array, simultaneously, according to the (N×M) numbers of pixel data outputted from the M numbers of data holding and outputting means when a stated control signal is inputted thereto, shift quantity designating means for designating the quantity of shift, storing means for storing pixel data contained in time-series image data as inputted, data adding means for adding first non-emission pixel data of the number corresponding to the quantity of shift before the stored pixel data, every time a predetermined quantity of pixel data is stored in the storing means, the non-emission pixel data is pixel data relating to the light emission elements which do not emit the light, and dividing and supplying means for adding second non-emission pixel data after the pixel data to which the first non-emission pixel data has been added so that the total number of pixel data becomes (N×M), and supplies the (N×M) numbers of pixel data as obtained to the M numbers of data holding and outputting means N numbers by N numbers.

In the exposure device thus structured according to the present invention, a preparation for driving all of the light emission elements is made in a time required for holding a predetermined number of pixels in one pixel data holding and outputting means. Also, since all of the light emission elements can be driven simultaneously by the driving means, the use of the exposure device according to the present invention enables an image forming device that can operate at a high speed and obtain an excellent printing result to be manufactured.

Also, since the dividing and supplying means operates in cooperation with the shift quantity designating means, the exposure device according to the present invention can correct a displacement in relative position between a photosensitive drum and a part (optical writing head) comprised of the light emission element array, the data holding and outputting means and the driving means, which is caused when the part is combined with the photosensitive drum (when the exposure device is manufactured).

In realizing the exposure device according to the present invention, it is desirable that the unit (the number of bits) of pixel data supplied to the dividing and supplying means is set to be larger than the unit of pixel data taken by the data holding and outputting means. In particular, it is desirable that the unit of pixel data supplied to the dividing and supplying means is set to be M times of the unit of pixel data taken by the data holding and outputting means.

With the application of the above structure, since parts requiring a high transfer rate is reduced, the exposure device can be manufactured more inexpensively.

The dividing and supplying means may supply the pixel data by use of M numbers of dual-port memories each of that can store at least (2×N) numbers of pixel data, in correspondence with the M numbers of data holding and outputting means, respectively. Also, the dividing and supplying means may supply the pixel data by use of M numbers of first memories that can store at least N pixel data in correspondence with the M numbers of data holding and outputting means, respectively, and M numbers of second memories that can store at least N pixel data in correspondence with the M numbers of data holding and outputting means, respectively.

Also, in realizing the exposure device by the application of the dividing and supplying means with the first memory and the second memory, there may be added abnormality judging means which detects differences in the number between times of writing accesses and times of reading accesses of the M numbers of first memories and the M numbers of second memories, respectively, for judging the presence/absence of abnormality on the basis of the differences in the number of times as detected.

Further, in manufacturing the exposure device according to the present invention, there may be added developing means for developing data given from an external device to produce the pixel data and supply the pixel data to the dividing and supplying means.

In addition, the exposure device may further comprise image data storing means for storing the image data, and image data superimposing means for obtaining a logical sum of the inputted time-series image data and the image data stored in the image data storing means to produce the pixel data and supply them to the dividing and supplying means.

BRIEF DESCRIPTION OF THE DRAWINGS

Other objects and advantages of the present invention will become apparent during the following discussion conjunction with the accompanying drawings, in which.

DETAILED DESCRIPTION OF THE PREFERRED EMBODIMENTS

A description will be given in detail of preferred embodiments of the present invention with reference to the accompanying drawings.

First, the structure and operation of two kinds of optical write heads (hereinafter referred to as "first optical write head and second optical write head") developed for exposure devices of the following respective embodiments will be described.

Figure 1:
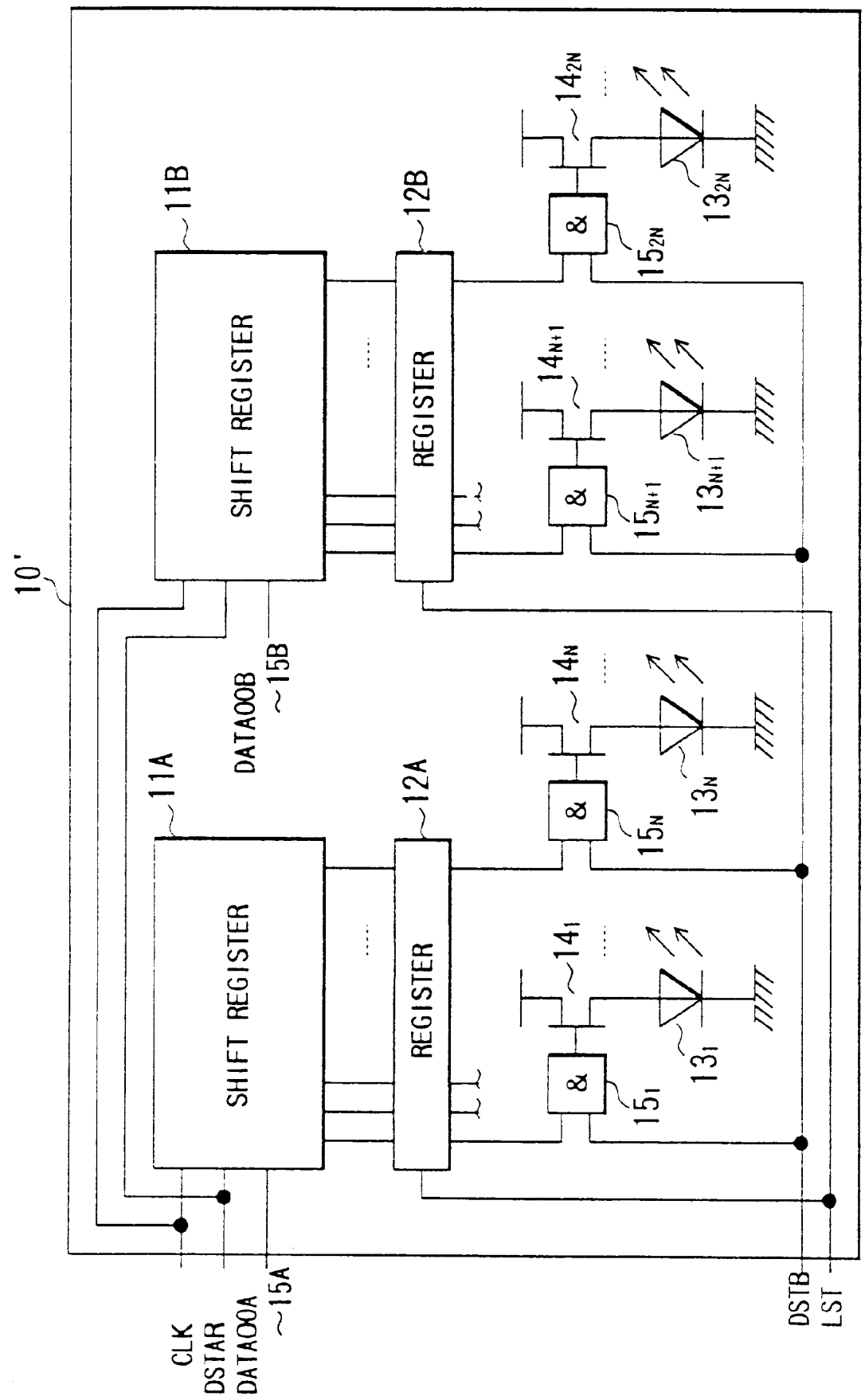
FIG. 1 is a block diagram showing the structure of a first optical write head in accordance with the present invention.

As shown in FIG. 1, a first optical write head 10' includes two shift registers 11A and 11B, two registers 12A and 12B, 2N numbers of LEDs $13_1$ to $13_{2N}$ aligned so as to conduct exposure for one line, switching elements $14_1$ to $14_{2N}$, and AND circuits $15_1$ to $15_{2N}$. Both of the shift registers 11A and 11B are comprised of shift registers which is capable of storing data of N numbers of bits therein, and similarly both of the registers 12A and 12B are comprised of registers which is capable of storing data of N bits therein.

The CLK terminal and the DSTAR terminal of the shift register 11A are connected to the CLK terminal and the DSTAR terminal of the shift register 11B, respectively. The N numbers of data output terminals of the shift register 11A are connected to the each of N numbers of data input terminals of the register 12A, and the N numbers of data output terminals of the shift register 11B are connected to each of the N numbers of data input terminals of the register 12B, respectively. The LST input terminal of the register 12A is connected to the LST input terminal of the register 12B, and the data output terminals of the registers 12A and 12B are connected to one input terminals of the AND circuits $15_1$ to $15_{2N}$, respectively. The other input terminals of all of the AND circuits 15 are connected to the resource of a drive signal DST, and the output terminals of the AND circuits $15_i$ (i=1 to 2N) are connected to the control terminals of the switching elements $14_i$, respectively.

Figure 2:
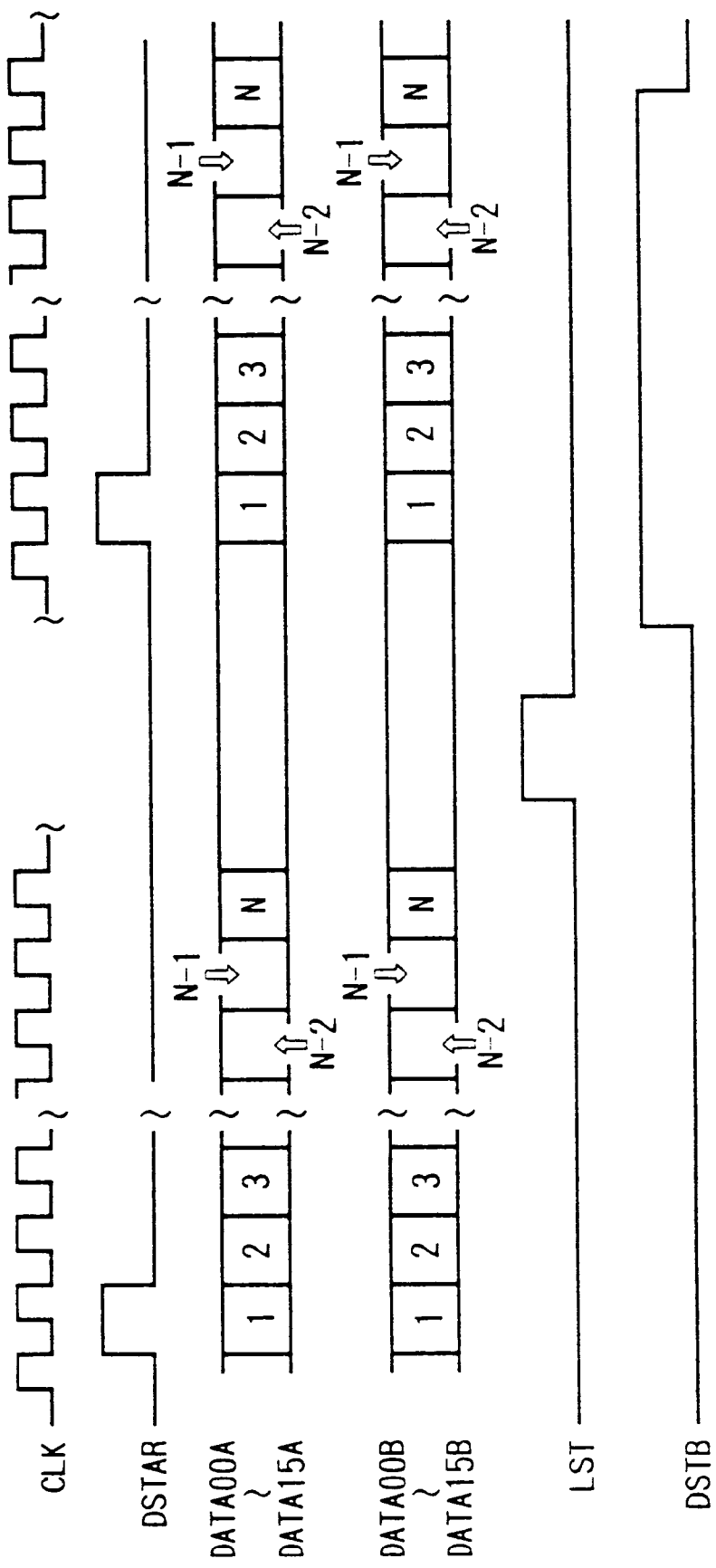
FIG. 2 is a timing chart for explanation of the operation of the first optical write head.

In the optical write head 10', as shown in FIG. 2, when a start signal DSTAR is given to the shift registers 11A and 11B, the shift registers 11A and 11B start a process of taking different data (DATA00A to 15A and DATA00B to 15B) simultaneously in synchronism with a shift clock CLK. Also, since both of the shift registers 11A and 11B are comprised of shift registers which are capable of storing data of N numbers of bits, transferring of data to both of the shift registers 11A and 11B is completed at the same time.

When a latch signal LST is given to the resisters; 12A and 12B, the outputs of the shift registers 11A and 11B are latched by the registers 12A and 12B, respectively. Thereafter, when a drive signal DSTB is given to several AND circuits 15 connected to the data output terminals of the registers 12A and 12B outputting high-level signals, high-level signals are outputted, and the switching elements 14 connected to the AND circuits 15 outputting the high-level signals are turned on correspondingly at the same time. As a result, only the LEDs 13 corresponding to the data output terminals that output the high-level signals are lighted simultaneously.

Accordingly, the optical write head 10' is allowed to conduct exposure in accordance with the raster data if the supply of N-bit data of the first half of raster data for one line to the shift register 11B and the supply of N-bit data of the second half to the shift register 11A are allowed to start simultaneously, and as shown in FIG. 2, the optical write head 10' is controlled so that the LST and the DSTB are sent at a step where the transfer of data of N bits is completed.

In this way, the optical writing head 10' is designed such that data for one line (data of 2N bits) can be set in the shift register within a predetermined time required for transferring data of N bits. For that reason, if the optical write head 10' is combined with a circuit that can continuously supply data for a plurality of lines, the exposure device can be realized which obtains an excellent printing result.

The optical writing head 10' is designed to take parallel data to those two shift registers 11A and 11B according to the same shift clock. Therefore, in order to permit the optical write head 10' to operate at a high speed, there is required that skew between the parallel data inputted to the shift registers 11A and 11B is small. However, in the case where a circuit that can supply parallel data large in bit width is combined with an IC outputting parallel data small in bit width, there cannot be obtained a circuit that can output parallel data small in skew. In addition, it is very difficult to realize a circuit that can supply parallel data large in bit width by means of one IC, and this arrangement also requires high costs.

In other words, in actually using the first optical write head 10', the frequency of the shift clock is limited by a request (skew performance or price) from a parallel data supplying circuit.

In order to eliminate the above limit, the second optical write head is developed.

Figure 3:
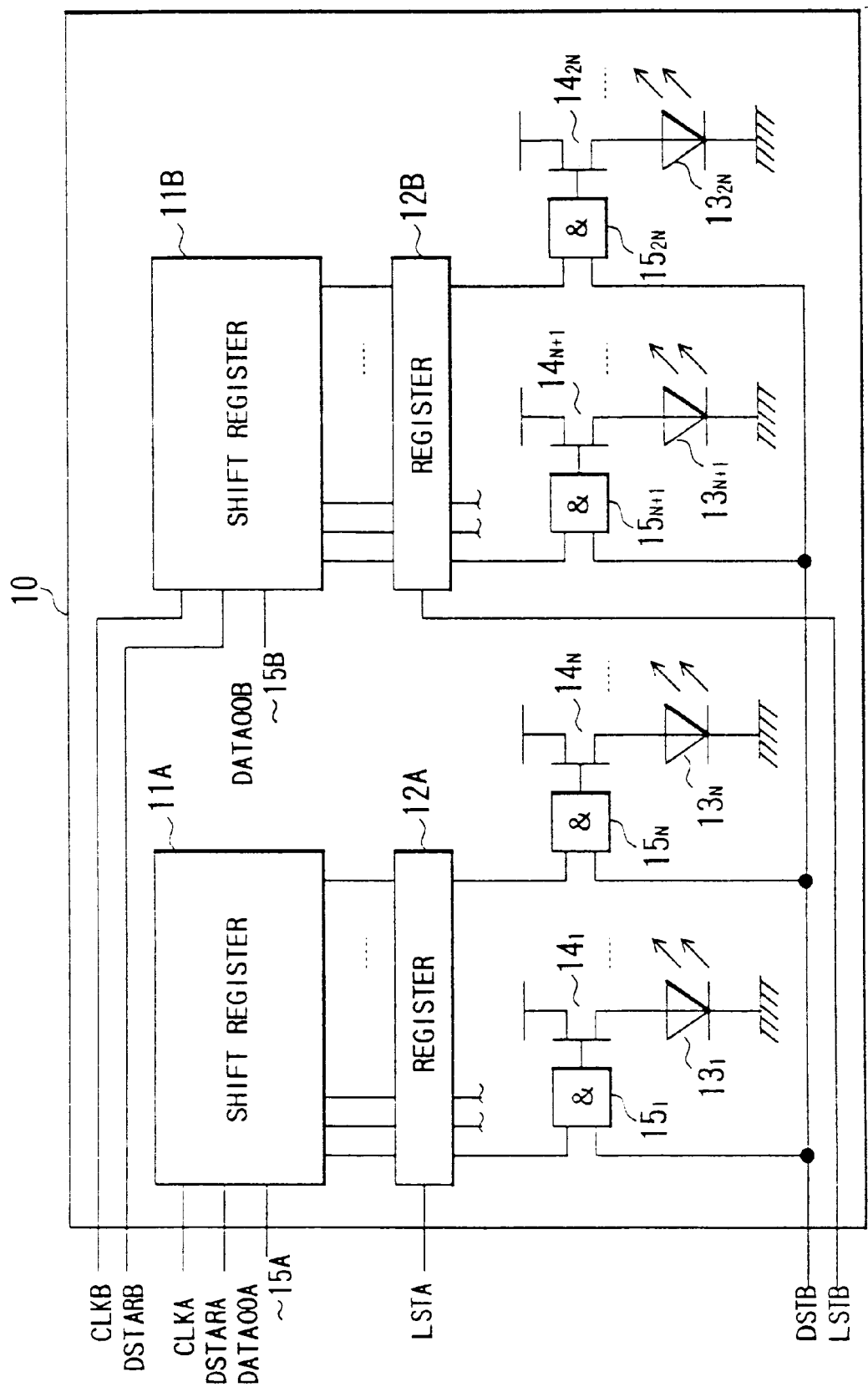
FIG. 3 is a block diagram showing the structure of a second optical write head in accordance with the present invention.

FIG. 3 shows the structure of the second optical write head 10. As shown in the figure, the second optical write head 10 is obtained from modifying the first optical write head 10' so that control signals (a start signal and a shift clock) can be supplied to the shift registers 11A and 11B as well as the registers 12A and 12B, independently.

The second optical write head 10 is a head that can set data to the respective shift registers 11, completely independently, and that can conduct exposure in accordance with the data set independently without any dispersion in the light emission timings of the respective LEDs.

Figure 4:
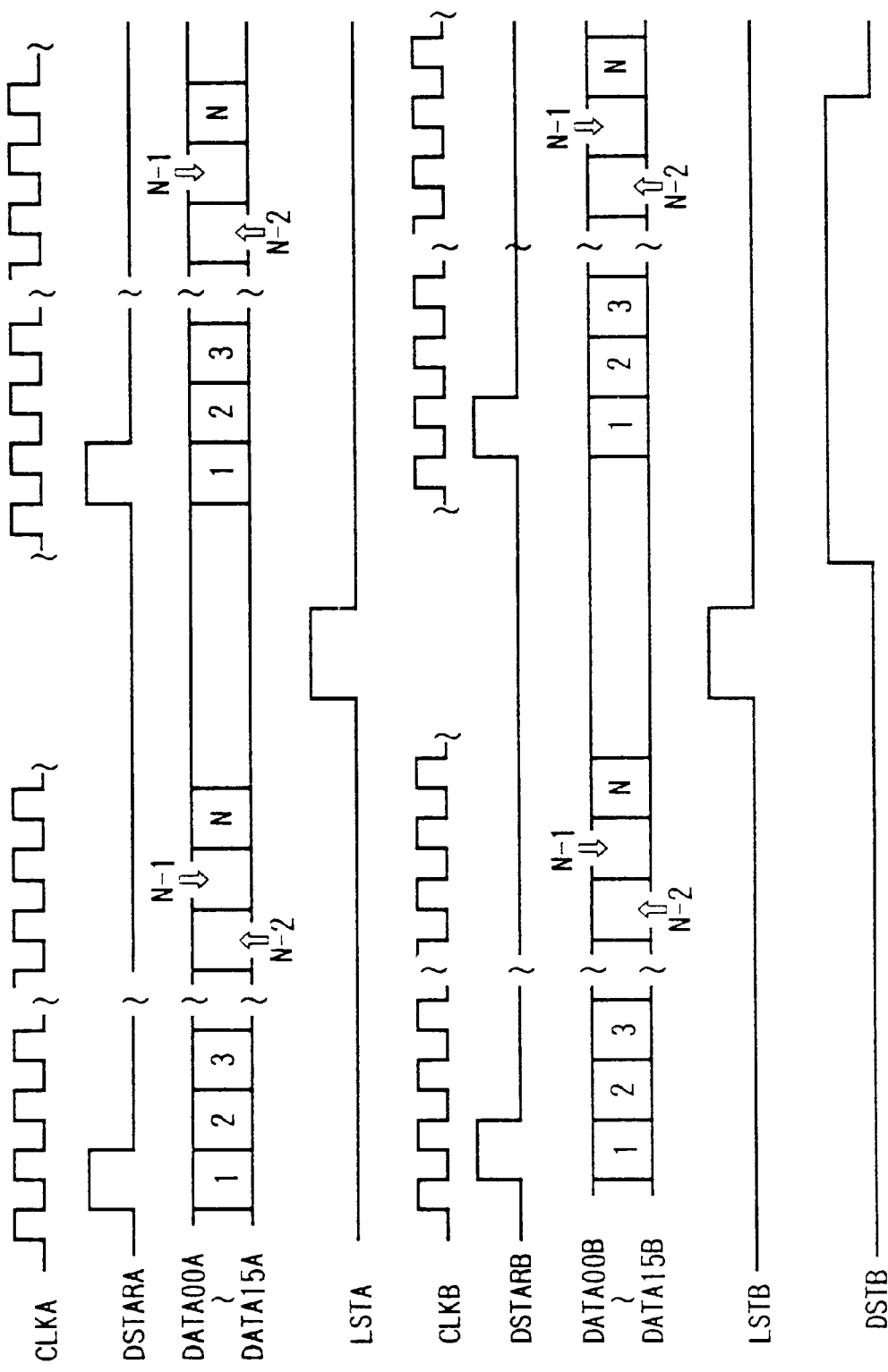
FIG. 4 is a timing chart for explanation of the operation of the second optical write head.

Accordingly, the second optical write head 10, as shown in FIG. 4, can be used even in a mode where DATA00A to 15A and DATA00B to 15B are inputted at different timings. The optical write head 10 is designed to be connectable to a circuit outputting DATA00A to 15A and DATA00B to 15B at different timings (DATA00A to 15A and DATA00B to 15B is not always outputted at the same timing). Since using the optical write head 10 releasing the performance limit given to other circuits in comparison with a case of using the first optical write head 10', an exposure device can be realized, which conducts exposure inexpensively, at a high speed and in a state where the light-emission timing is not dispersed.

Hereinafter, a specific manner of using the first and second optical write heads (how to install the first and second optical writing heads in the exposure device) will be described with reference to various embodiments of the exposure device.

Figure 5:
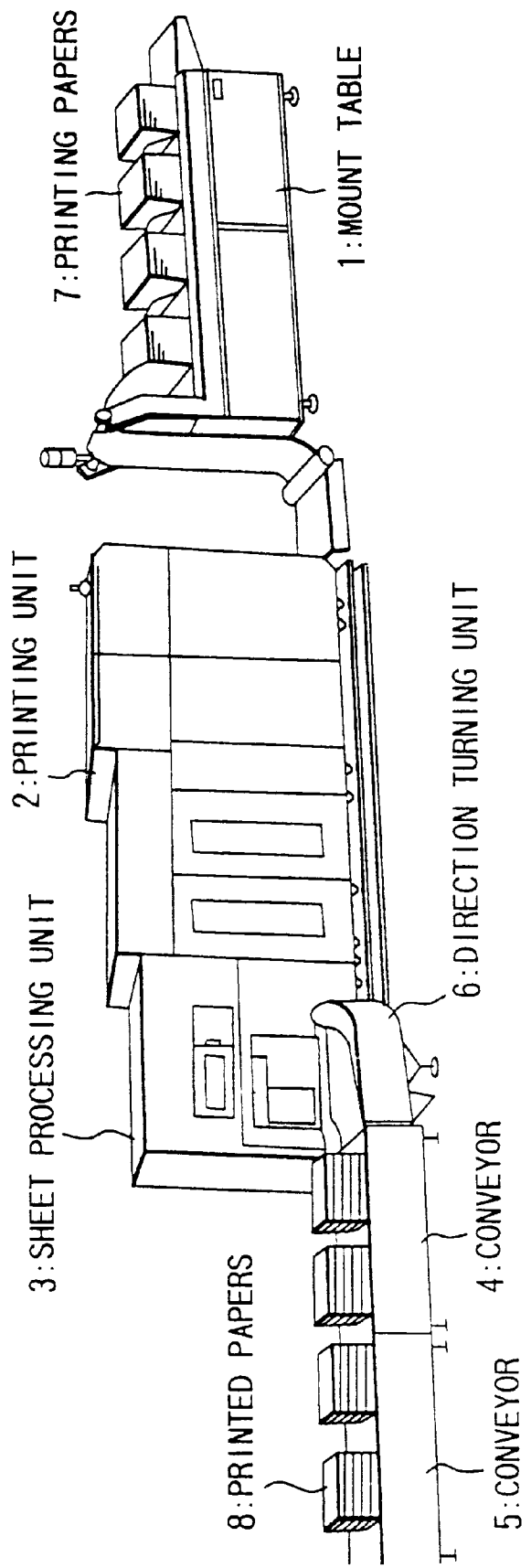
FIG. 5 is a diagram showing an appearance of a printer manufactured by use of the exposure device according to embodiments of the present invention.
Figure 6:
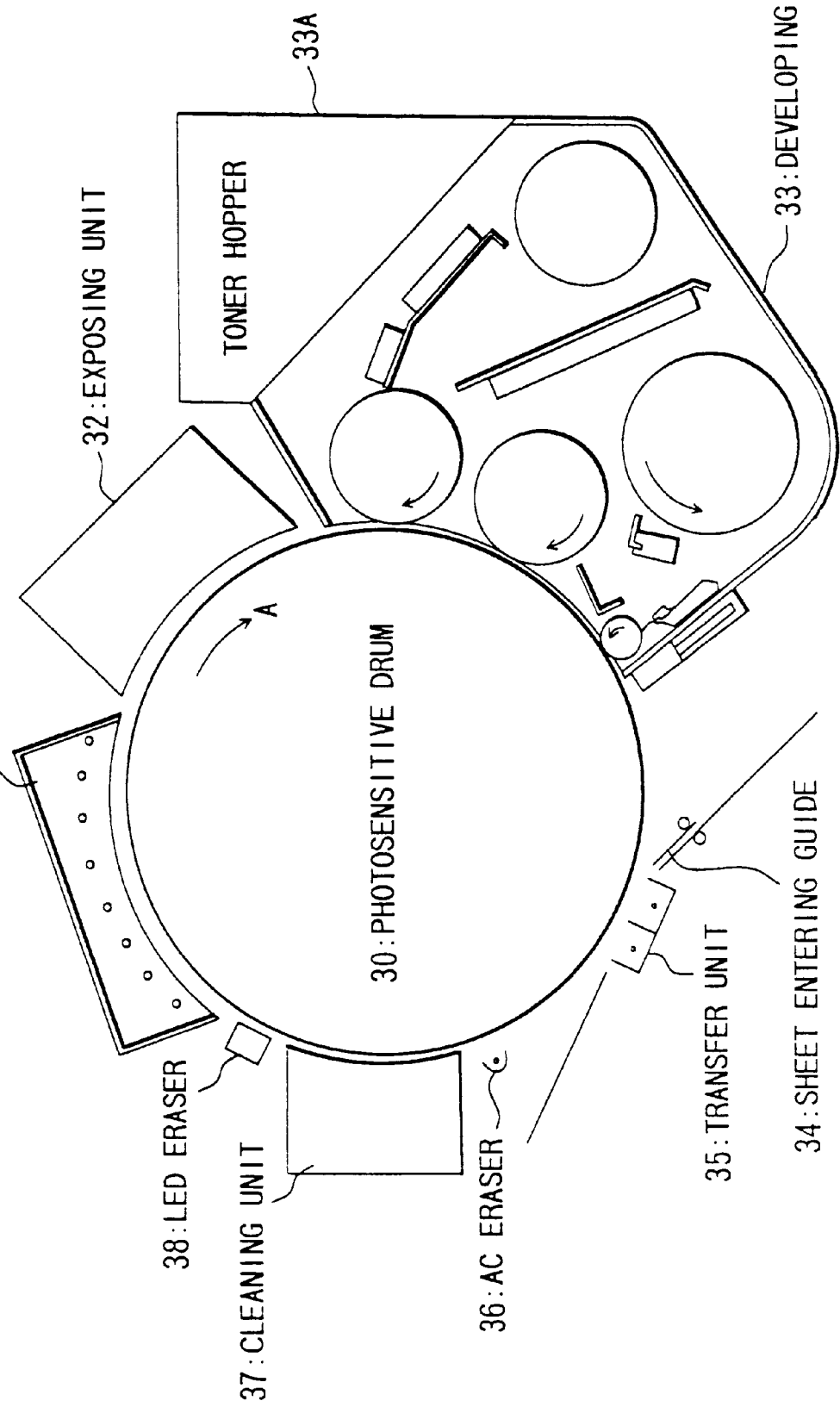
FIG. 6 is a longitudinal sectional view of a process unit provided in the printer.

Before the description of the structure and operation of the exposure device according to each embodiment, the outline of the structure and operation of a printer manufactured using the exposure device of each embodiment will be described with reference to FIGS. 5 and 6. FIG. 5 is a perspective view showing the appearance of the printer, and FIG. 6 is a longitudinal sectional view showing a process section provided in a printing section that constitutes the printer.

As shown in FIG. 5, the printer manufactured using the exposure device of each embodiment is made up of a mount table 1 on which printing papers 7 to be printed is mounted, a printing unit for actually printing the printing papers 7 supplied from the mount table 1, and a sheet processing-section 3 for processing printed paper 8 printed every job (unit of print processing) by the printing section 2. Also, the printer is designed so as to be combined with a direction turning unit 6 and conveyors 4, 5 in use.

Printing papers 7 which are unprinted continuous sheets folded up are mounted on the mount table 1 by a unit of market box (about 1,500 in one box). The printer of the embodiments in principle operates with the printing papers 7 in this box unit as unit of one processing. The printer is also structured so as to print the plural boxes of printing papers 7, if the printing papers 7 for plural boxes are mounted on the mount table 1 and a rear end of the printing paper 7 of each box unit is connected mutually to a front end of the printing paper 7 of a succeeding box unit by a piece of cellophane tape.

The printing unit 2 is connected to a host computer through a network. The printing section 2 prints print data from the host computer on the printing paper 7 supplied from the mount table 1 and sends the printed paper 8 to the sheet processing unit 3 as the print result.

The sheet processing unit 3 sequentially piles up the printed papers 8 from the printing unit 2 on the table provided within the sheet processing unit 3. Then, when a quantity of printed papers 8 piled up on the table reaches a predetermined quantity (for example, the above-described quantity of box unit), the sheet processing unit 3 carries the printed papers 8 to the direction turning unit 6 from a side face thereof.

The direction turning unit 6 turns the carrying direction of the printed papers 8 of the predetermined quantity carried from the side face of the sheet processing section 3 to a direction along which the mounting table 1, the printing section 2 and the sheet processing section 3 are aligned (the flow direction of the conveyors 4 and 5) so as to carry the printed papers 8 onto the conveyor 4. Each of the conveyors 4 and 5 has a mechanism that makes it possible to mount plural printed papers 8 thereon and also to carry the printed papers 8 in the above-described alignment direction. The conveyor 4 receives the printed papers 8 from the direction turning unit 6 and then carries the printed papers 8 onto the conveyor 5 when the printed papers 8 are fully mounted on the conveyer 4. The printed papers 8 printed by the printer of each embodiment wait for a user who requested a print output to receive the printed papers 8 on those conveyors.

The conveyors 4, 5 and the direction turning unit 6 are designed to be connected to the printer in a state where the printer is located (layout, a located space, etc.) or in a mode suited to the quantity of the print output. For example, the conveyor 4 may be connected directly to the sheet processing unit 3 without using the direction turning unit 6, or only the conveyor 4 may be connected to the direction turning unit 6.

The printing unit 2 is provided with a process unit having a structure shown in FIG. 6. That is, the printing unit 2 is equipped with the process section including a photosensitive drum 30, a pre-charging unit 31 disposed around the photosensitive drum 30, an exposing unit (exposure device) 32, a developing unit 33, a sheet entering guide 34, a transfer unit (transfer charger) 35, an AC eraser 36, a cleaning section 37 and an LED eraser 38.

In printing, the photosensitive drum 30 is rotationally driven in the direction of an arrow A indicated in the figure, and the surface of the photosensitive drum 30 is uniformly charged by the pre-charging unit 31. Then, exposure is conducted in a pattern responsive to print data by the exposing unit (exposure device) 32 using an optical write head which will be described later according to the present invention, so that an electrostatic latent image is formed on the surface of the charged photosensitive drum 30 according to the print data. Subsequently, the electrostatic latent image is developed by the developing unit 33 (a process for sticking toner stored within a toner hopper 33A to an electrostatic latent image is conducted) to form a toner image as a visual image.

Within the printing unit 2, the printing paper 7 supplied from the mount table 1 is carried between the transfer unit 35 and the photosensitive drum 30 while being guided by the guide 34 in synchronism with the above operation. The toner image formed on the photosensitive drum 30 is transferred onto the printing paper 7 by the transfer unit 35. Thereafter, the printing paper 7 is carried to a fixing unit (not shown) along a carrying path 29, and then the toner image is fixed onto the printing paper 7 due to heat, pressure, or light in the fixing section. The printing paper 7 as fixed is supplied to the sheet processing unit 3 as the printed paper 8.

After the transfer process, a part of toner remains on the surface of the photosensitive drum 30 without being transferred to the printing paper 7. The AC eraser 36 and the cleaning unit 37 are a mechanism for removing the residual toner from the photosensitive drum 30. The residual toner is mechanically removed from the surface of the photosensitive drum 30 by the cleaning unit 37 after electric charges are removed by the AC eraser 36. After removal of the residual toner, static electricity is removed by the LED eraser 38 so that the surface of the photosensitive drum 30 is returned to an initial state (state in which potential is 0V).

(First Embodiment)

Figure 7:
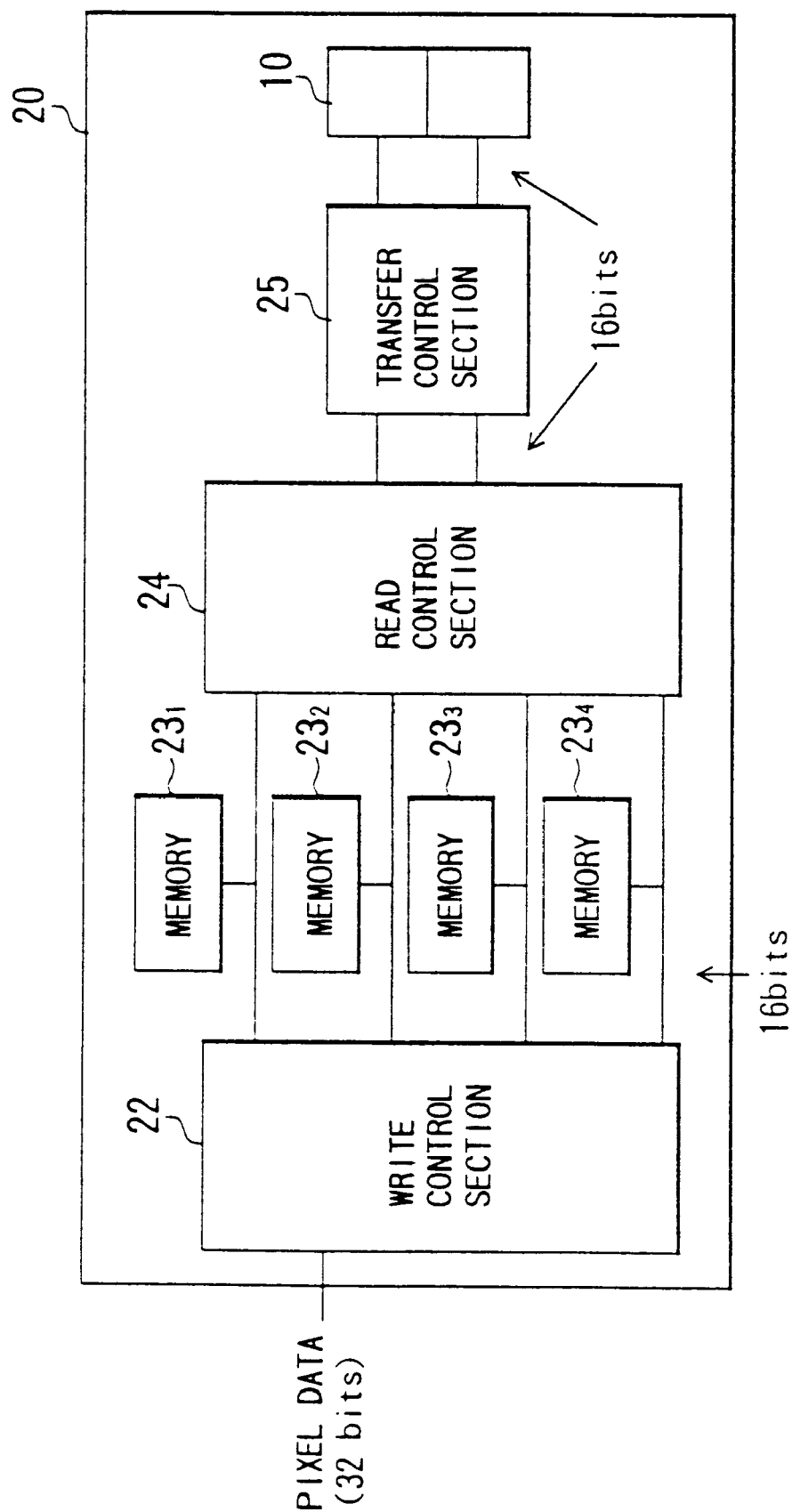
FIG. 7 is a block diagram showing the structure of an exposure device in accordance with a first embodiment of the present invention.

FIG. 7 shows the structure of an exposure device 20 in accordance with a first embodiment of the present invention. As shown in the figure, the exposure device 20 according to the first embodiment includes a write control section 22, memories $23_1$ to $23_4$, a read control section 24, a transfer control section 25, and an optical write head 10 (the above-described second optical writing head).

All of the memories $23_1$ to $23_4$ are memories of 16-bit width having the capacity that can store data of ½ lines of the optical write head 10, and each of the memories 23 is connected to the write control section 22 and the read control section 24 through a bus of 16-bit width.

Figure 8:
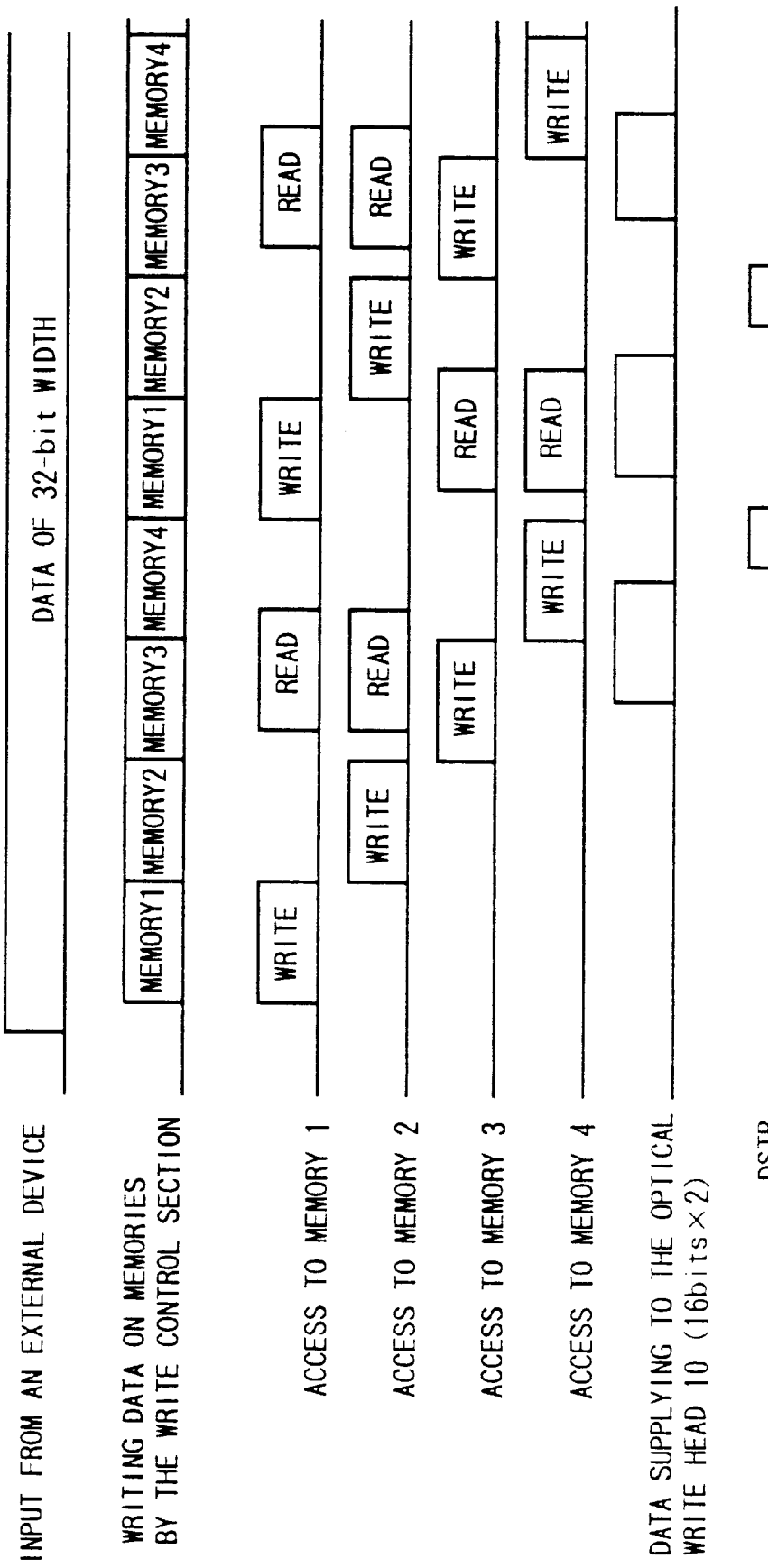
FIG. 8 is a timing chart for explanation of the operation of the exposure device in accordance with the first embodiment.

The write control section 22 is connected to an external device (not shown) so as to receive data of 32-bit width from the external device. The write control section 22 converts the received data of 32-bit width to data of 16-bit width and writes the data thus converted on the memory $23_1$ in the case where the external device starts supplying data to the write control section 22 as schematically shown in FIG. 8 (in FIG. 8, the memory $23_i$ (i=1 to 4) is indicated as a memory i). After writing of data of ½ lines into the memory $23_1$ is completed, the memory for writing data is changed to the memory $23_2$. After writing of data of ½ lines into the memory $23_2$ is completed, the memory for writing data is changed to the memory $23_3$. The write control section 22 repeats such processing as far as the external device continues supplying the data to the write control section 22.

After writing of data into the memories $23_1$ and $23_2$, the read control section 24 reads data from the memories $23_1$ and $23_2$ while data is being written on the memory $23_3$ or $23_4$. Also, after writing of data into the memories $23_3$ or $23_4$, the read control section 24 reads data from the memories $23_3$ and $23_4$ while data is being written on the memory $23_1$ or $23_2$.

The transfer control section 25 receives two kinds of 16-bit data from the read control section 24, and supplies the data to the data input terminals of the shift registers 11A and 11B within the optical write head 10. The transfer control section 25 also supplies start signals DSTARA, DSTARB and the shift clocks CLKA, CLKB to the shift registers 11A and 11B. On the completion of the supply of data for ½ lines, after latch signals LSTA and LSTB are supplied to the registers 12A and 12B, the drive signal DSTB is supplied to the AND circuits of the optical write head 10, to thereby drive the respective LEDs 13 at the same time.

In other words, as was already described, the optical write head 10 is designed so as to complete setting of data for one line in a time required for transferring data for ½ lines. In order to conduct exposure for one page with the above advantage, data for one line must be supplied from the external device supplying image data to the optical write head 10 every time (a time required for transferring data for ½ lines+α) required for conducting exposure for one line by the optical write head 10. In this situation, since it is not preferable that a section requiring a high transfer speed exists, the number of bits of input image data is set at 32 bits in the optical write head 10 according to the first embodiment. Then, in order that the first half part and the second half part of data for one line can be supplied to the optical write head 10 (nearly) at the same time, the first half part is stored in the memory 23 until the second half part of data for one line is obtained.

In this way, the exposure device 20 according to the first embodiment is designed to sufficiently exhibit the performance of the optical write head 10, and the exposure device 20 according to this embodiment makes it possible to an excellent printed matter to be obtained at a high speed. In addition, since there is no section that requires high-speed data transfer, the exposure device 20 can be manufactured relatively inexpensively.

(Second Embodiment)

Figure 9:
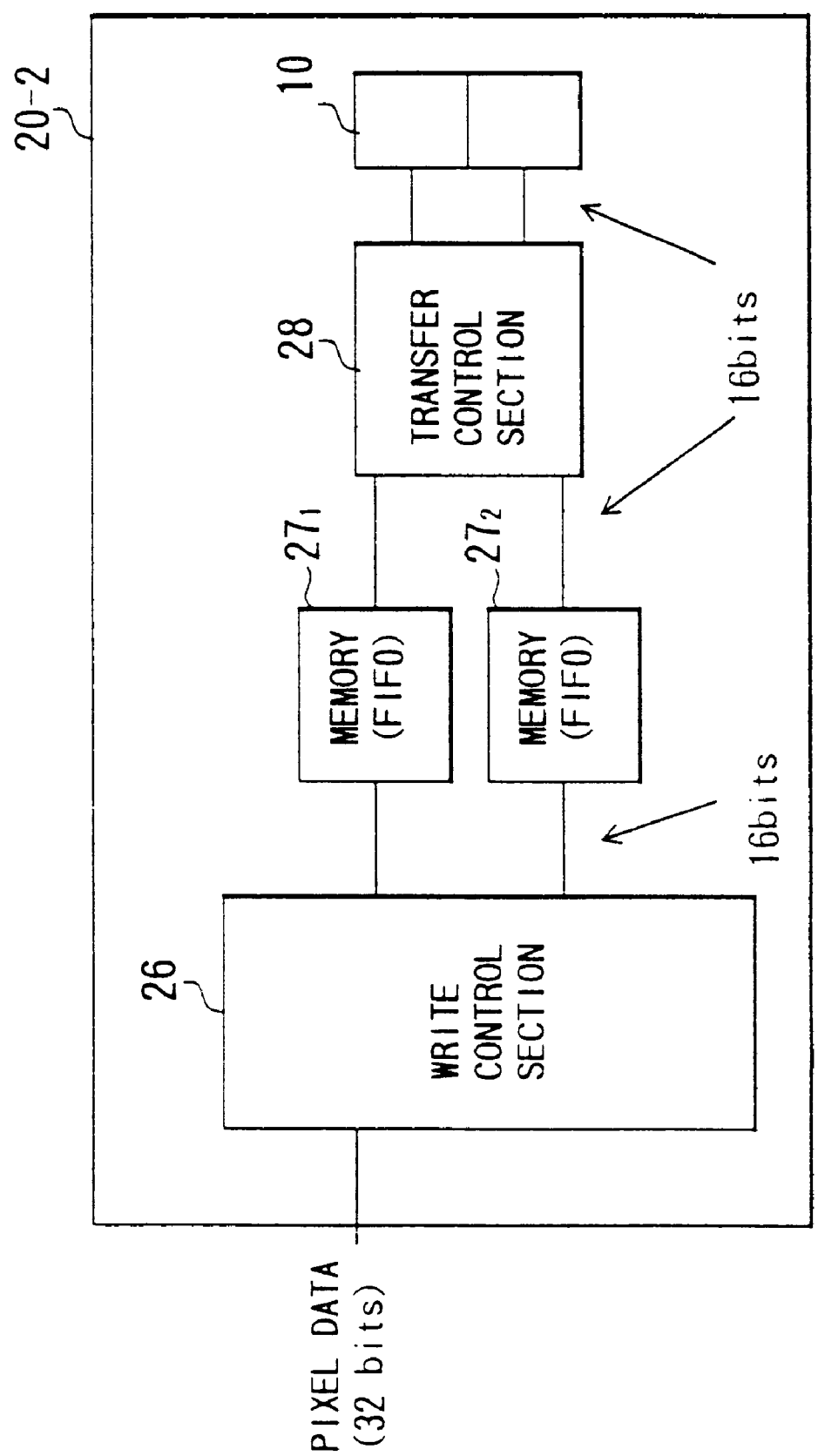
FIG. 9 is a block diagram showing the structure of an exposure device in accordance with a second embodiment of the present invention.

FIG. 9 shows the structure of an exposure device in accordance with a second embodiment of the present invention. An exposure device 20-2 according to the second embodiment results from modifying the exposure device 20 of the first embodiment, and as shown in the figure, the exposure device 20-2 includes a write control section 26, memories 27$_1$, 27$_2$, a transfer control section 28 and an optical write head 10.

The memory 27 is an FIFO (first in, first out) memory that can store data for one line therein. The write control section 26 and the transfer control section 28 operate in substantially the same manner as the write control section 22 and the transfer control section 24 within the exposure device 20 of the first embodiment.

Figure 10:
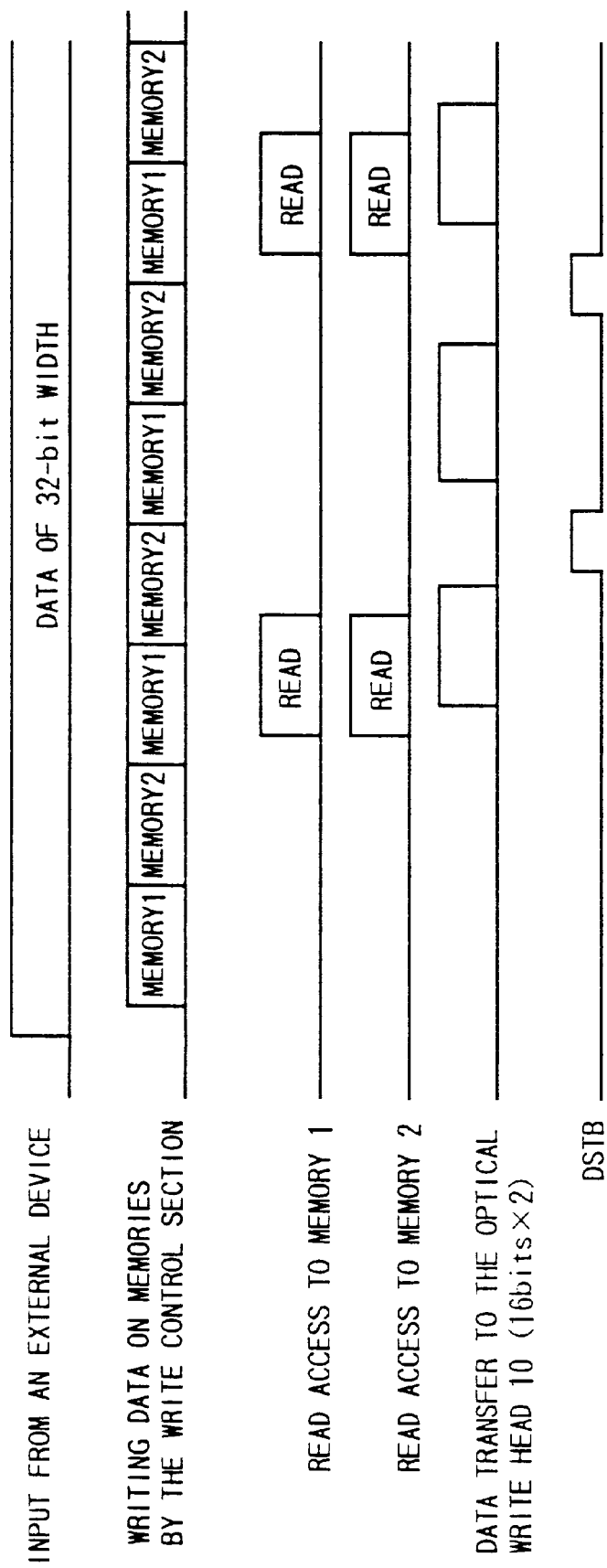
FIG. 10 is a timing chart for explanation of the operation of the exposure device in accordance with the second embodiment.

In other words, the write control section 26 first converts supplied data of 32-bit width into data of 16-bit width and writes the data thus converted on the memory 27$_1$ in the case where the external device starts supplying data to the write control section 26 as schematically shown in FIG. 10 (in FIG. 10, the memory 27$_1$ is indicated as a memory 1). After writing of data of ½ lines into the memory 27$_1$ is completed, the memory for writing data is changed to the memory 27$_2$ (memory 2 in FIG. 10). After writing of data of ½ lines into the memory 27$_2$ is completed, the memory for writing data is returned to the memory 27$_1$, and data for ½ lines is written into the memory 27$_1$ from the external device in a mode where data previously written is not erased. The write control section 26 repeats such processing as far as the external device continues supplying the data to the write control section 26.

The transfer control section 28 reads two kinds of 16-bit data for ½ lines from the first predetermined positions (addresses) of both the memories 27, and supplies the data to the data input terminals of the shift registers 11A and 11B within the optical write head 10. The transfer control section 28 also supplies various control signals to the optical writing head 10 (a shift register, a register and an AND circuit). Subsequently, the data for ½ lines from the second predetermined positions of both the memories 27 is processed similarly, and in the case where the processing is completed, the data for ½ lines from the first predetermined positions of both the memories 27 is again processed. In other words, the transfer control section 28 repeats a process for supplying data stored in a region different from a region into which data is written by the write control section 26 to the optical write head 10.

Since the data transfer timing in the exposure device 20-2 is identical with that of the exposure device according to the first embodiment, the exposure device 20-2 according to the second embodiment can obtain an excellent printed matter at a high speed.

(Third Embodiment)

Figure 11:
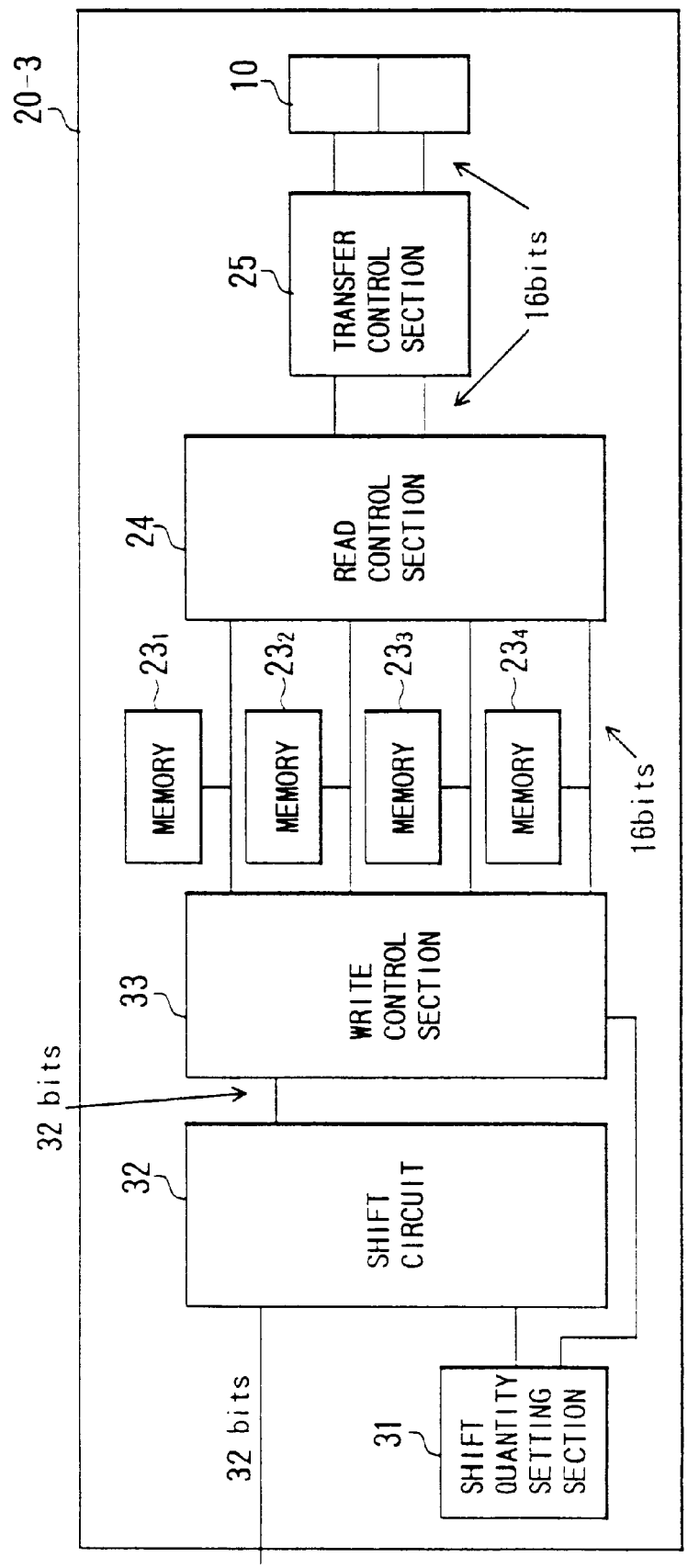
FIG. 11 is a block diagram showing the structure of an exposure device in accordance with a third embodiment of the present invention.

FIG. 11 shows the structure of an exposure device 20-3 in accordance with a third embodiment of the present invention. The exposure device 20-3 according to the third embodiment results from modifying the exposure device 20 of the first embodiment, and as shown in the figure, the exposure device 20-3 is designed to employ a write control section 33 instead of the write control section 22 and add a shift quantity setting section 31 and a shift circuit 32.

The shift quantity setting section 31 and the shift circuit 32 are circuits provided for shifting a position at which exposure is conducted in response to image data of each line unit from the external device. In other words, the shift quantity setting section 31 and the shift circuit 32 are circuits provided for correcting a shift of the positional relation between the optical write head 10 and the photosensitive drum, the shift is caused when combining the optical writing head 10 and the photosensitive drum 30.

Figure 12:
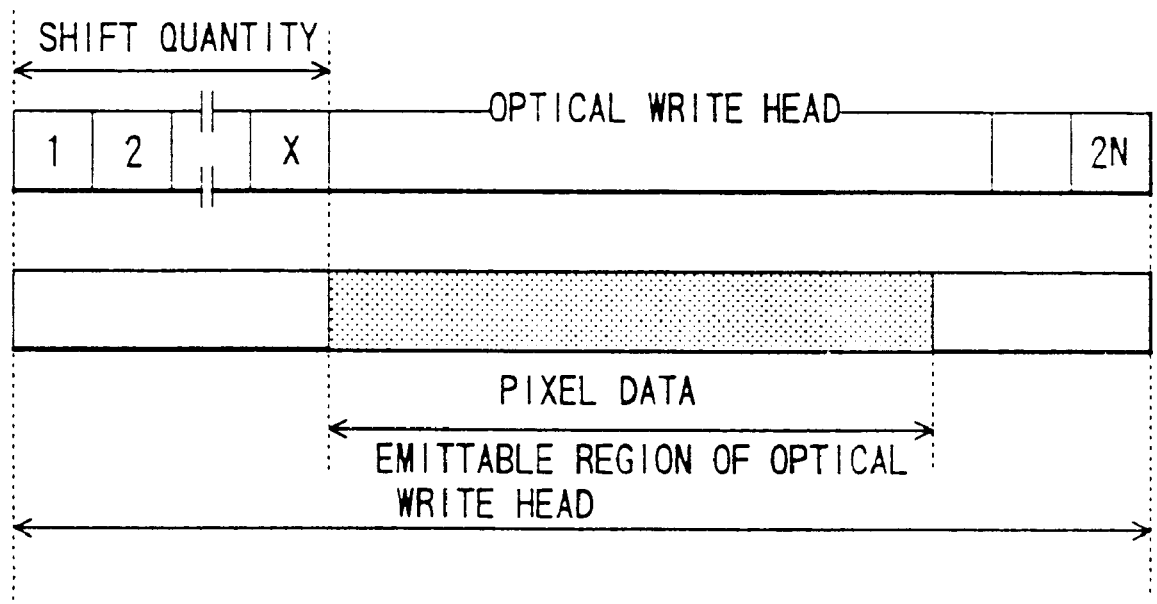
FIG. 12 is a diagram for explanation of the quantity of shift.

The shift quantity setting section 31 is made up of a dip switch and one type of an encoder. In the dip switch, a value designating the number of dots to be shifted (hereinafter referred to as "the quantity of shift") is set at the time of when the exposure device 20-3 is adjusted. In other words, as schematically shown in FIG. 12, a value that designates from which dot of the optical write head 10 the image data should be displayed. The encoder supplies a signal corresponding to a remainder resulting from dividing the quantity of shift set in the dip switch by 32 (a 32-bit signal in which only a bit corresponding to the remainder is "1", and other bits are "0") to the shift circuit 32. Also, the encoder supplies a signal indicative of a value rounding a quotient obtained by dividing the quantity of shift by 32 to an integer to the write control section 33.

The shift circuit 32 is a circuit having a barrel shifter and shifts image data from the external device for the quantity responsive to the signal from the shift quantity setting section 31 to supply the shifted image data to the write control section 33. The details of the shift circuit and the barrel shifter will be described with reference to a succeeding embodiment.

The write control section 33 converts supplied data of 32-bit width into data of 16-bit width and writes the data thus converted to the respective memories 23 ½ lines by ½ lines. The write control section 33 writes data "all 0" of the number responsive to the signal from the shift quantity setting section 31 before the initial data of the respective lines is written. For example, in the case where a signal indicating "1" is supplied from the shift quantity setting section 31, the write control section 33 starts to write the supplied data after it writes two of data "all 0" of 16 bits to the memory 23$_1$ or 23$_3$.

Figure 13:
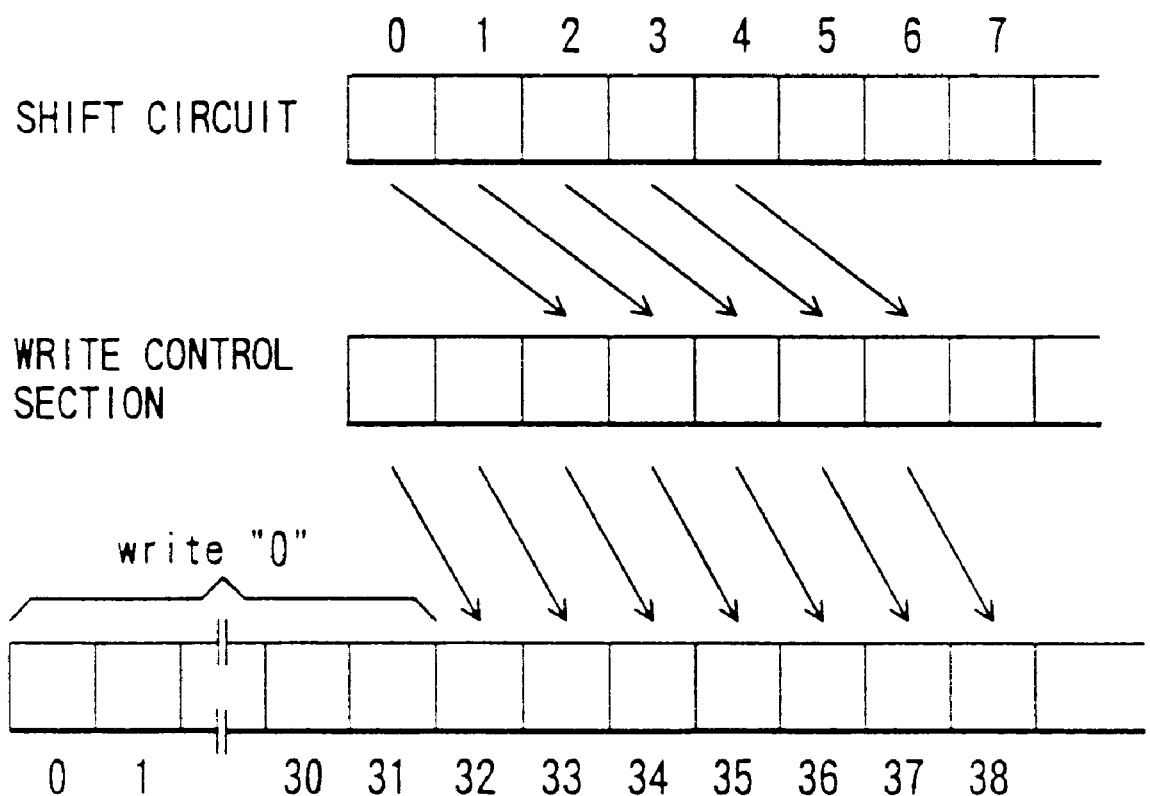
FIG. 13 is a diagram for explanation of the shifting operation of the exposure device in accordance with the third embodiment of the present invention.

In summary, in the exposure device 20-3 according to this embodiment, in the case where the quantity of shift is set at (32a+b) dots (b<31), after the data is shifted for b dots by the shift circuit 32, the data is shifted for 32a dots by the write control section 33, to thereby the data is shifted for (32a+b) dots in total. For example, in the case where shift of 34 dots (a=1, b=2) is indicated, as schematically shown in FIG. 13, after the data is shifted for 2 dots by the shift circuit, the data is further shifted for 32 dots by the write control section.

In this way, the exposure device 20-3 according to this embodiment can obtain an excellent printed matter at a high speed, and also can correct a shift of the positional relation between the optical write head 10 and the photosensitive drum 30, the shift is caused when combining the optical write head 10 and the photosensitive drum 30 together.

(Fourth Embodiment)

Figure 14:
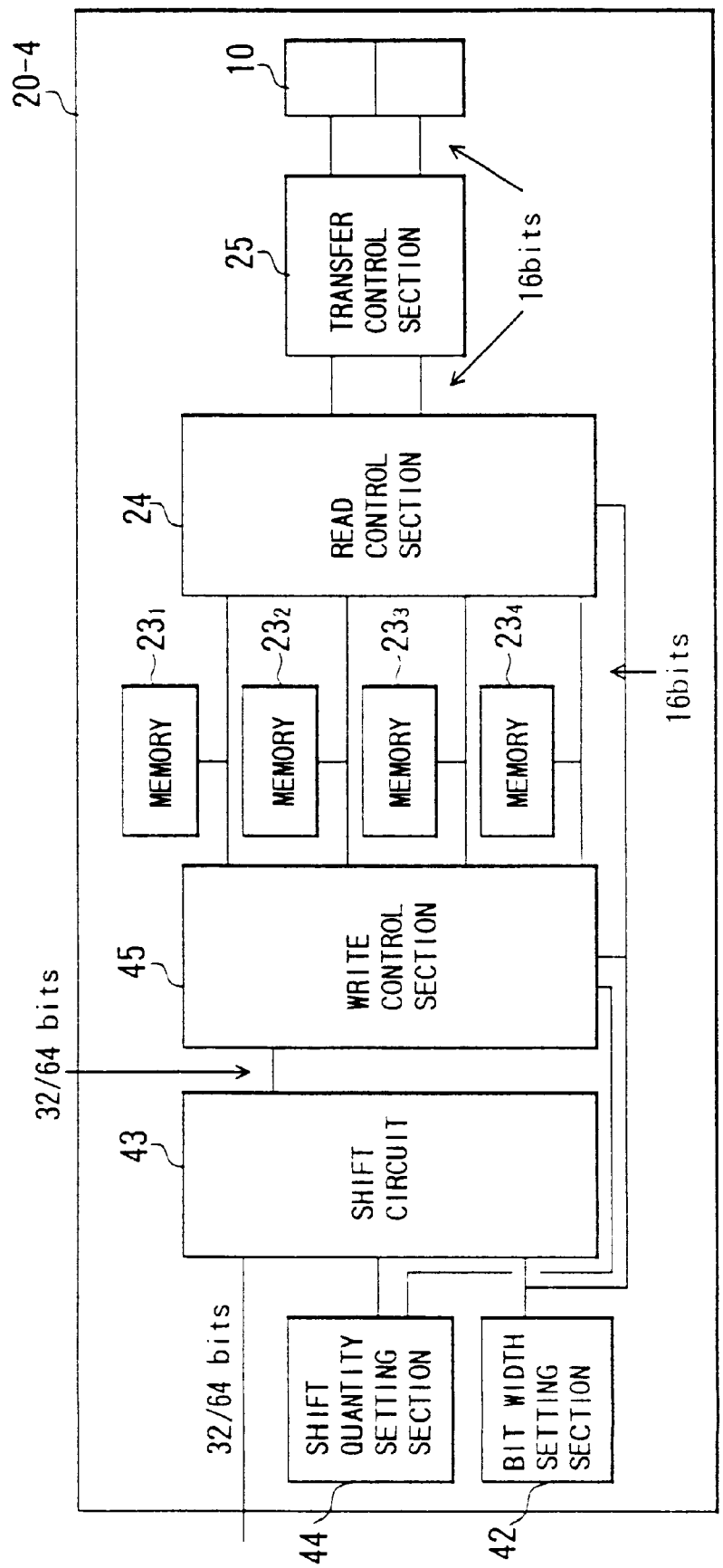
FIG. 14 is a block diagram showing the structure of an exposure device in accordance with a fourth embodiment of the present invention.

FIG. 14 shows the structure of an exposure device in accordance with a fourth embodiment of the present invention.

The exposure device according to the fourth embodiment results from modifying the exposure device (FIG. 11) of the third embodiment so as to also receive data of 64-bit width. For that reason, the exposure device 20-4 according to the fourth embodiment additionally includes a bit width setting section 42, and employs a shift circuit 43 instead of the shift circuit 32. Also, the exposure device 20-4 employs a shift quantity setting section 44 outputting a signal of 64 bits to the shift circuit 43 instead of the shift quantity setting section 31. In addition, the exposure device 20-4 employs a write control section 45 instead of the write control section 33. The write control section 45 can also process data of 64 bits as well as data of 32 bits.

The bit width setting section 42 is a circuit for supplying a signal indicating the bit width of image data from the external device to the shift circuit 43, etc.

The shift quantity setting section 44 is made up of a dip switch and one type of an encoder. In the dip switch, a value designating the shift quantity is set when the exposure device 20-4 is adjusted. The encoder supplies a signal corresponding to a remainder resulting from dividing the shift quantity set in the dip switch by 64 (a 64-bit signal in which only a bit corresponding to the remainder is "1") to the shift circuit 43. The encoder supplies a signal indicating a value rounding a quotient obtained by dividing the quantity of shift by 64 to an integer to the write control section 45.

Figure 15:
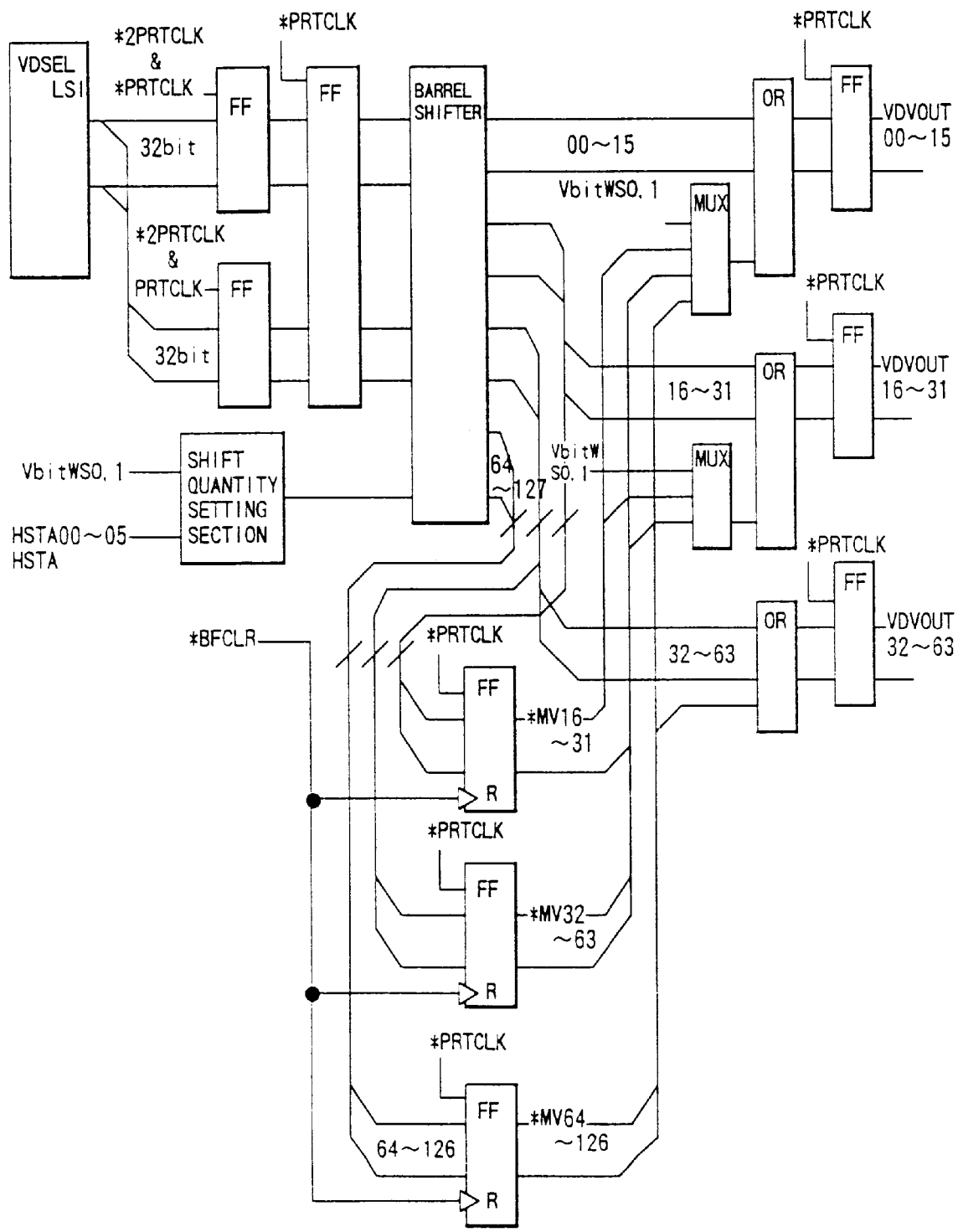
FIG. 15 is a block diagram showing the structure of a shift circuit provided in the exposure device according to the fourth embodiment.
Figure 16:
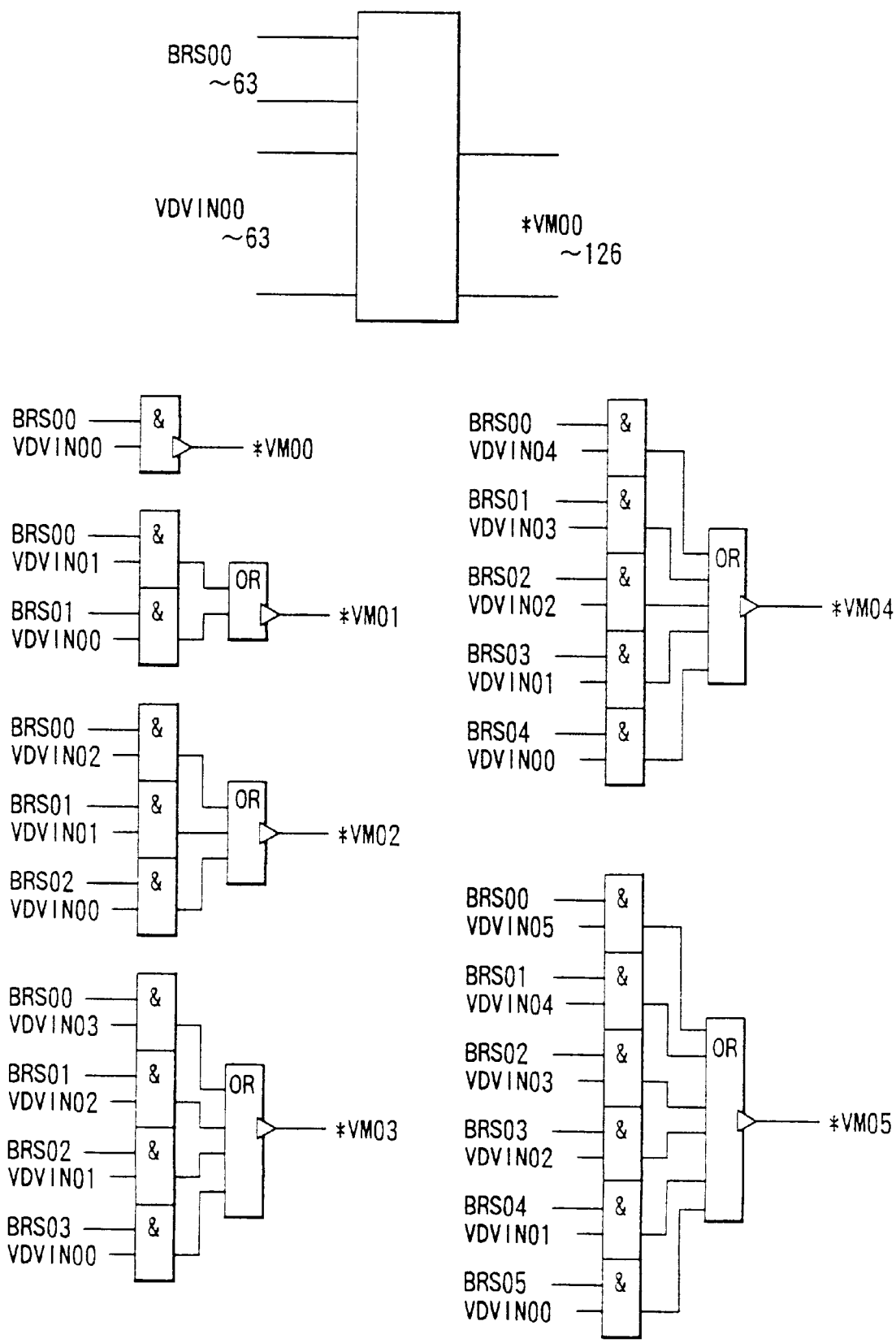
FIG. 16 is a diagram for explanation of a barrel shifter used in a shift circuit provided in the exposure device according to the fourth embodiment.

FIGS. 15 and 16 show the outline of the structure of the shift circuit 43 and a barrel shifter.

As shown in FIG. 15, the shift circuit 43 is made up of a barrel shifter, a flip flop (FF) and a multiplexer (MUX) combined together.

The barrel shifter used in the shift circuit 43 is a circuit that outputs data of 128 bits including data obtained by shifting inputted data of 64 bits for the number of bits (0 to 63) designated by the shift quantity setting section 44. The barrel shifter is made up of an AND gate and an OR gate combined together. In particular, as shown in FIG. 16, the 0-th bit output *VM00 of the barrel shifter is obtained from a logical product of the 0-th bit input VDVIN00 and BRS00 which is a signal from the shift quantity setting section 44. As was already described, the signal given to the shift circuit 43 from the shift quantity setting section 44 is a signal in which only a bit indicating the shift quantity is "1". For that reason, the value of *VM00 is identical with VDVIN00 only when BRS00 is "1" (when the shift quantity is "0"), but the value of *VM00 is "0" when BRS00 is not "1" (when the shift quantity is not "0"). Also, the first bit output *VM01 of the barrel shifter is produced by operating the 0-th bit input VDVIN00, the first bit input VDVIN01, BR00 and BRS01. In other words, *VM01 should be equal to VDVIN01 when the quantity of shift is "0" (only BR00 is "1"), and it should be equal to VDVIN00 when the quantity of shift is "1" (when only BR01 is "1"). Therefore, *VM01 is obtained from the logical operation of those related signals. In the barrel shifter, other bits are similarly produced by the logical operations of the related signals (refer to the circuits up to *VM05 shown in the figure).

Returning to FIG. 15, the description of the shift circuit 43 will be continued. As shown in the figure, the outputs 00 to 63 of the barrel shifter are connected to three FFs (hereinafter referred to as "final stage FF") through an OR circuits. The final stage FFs are circuits for outputting signals (VDVOUT00 to 63) as outputs of the shift circuit 43. Also, the outputs 64 to 127 are connected to the final stage FFs through FFs (hereinafter referred to as "intermediate FF"), the MUX and the OR circuit.

The outputs 00 to 63 and the outputs 64 to 127 of the barrel shifter are latched by the final stage FFs and the intermediate FFs in response to the *PRTCLK. In the succeeding *PRTCLK cycle, logical sums of the latched outputs 64 to 127 and the outputs of the lower bit of the barrel shifter (as a result of shifting, it becomes "0") are outputted as VDVOUT00 to 63. In other words, the surplus bits due to shifting are outputted as the lower bit of the succeeding 64 bits.

Then, in the shift circuit 43, the MUX operates in response to a signal VbitWS0 and 1 indicating the bit width supplied from the bit width setting section 42 to change the output bit width (change a position to which a signal is outputted from the barrel shifter).

In this way, since the exposure device 20-4 can receive image data in different data width, it can be used with connection to various external devices.

(Fifth Embodiment)

Figure 17:
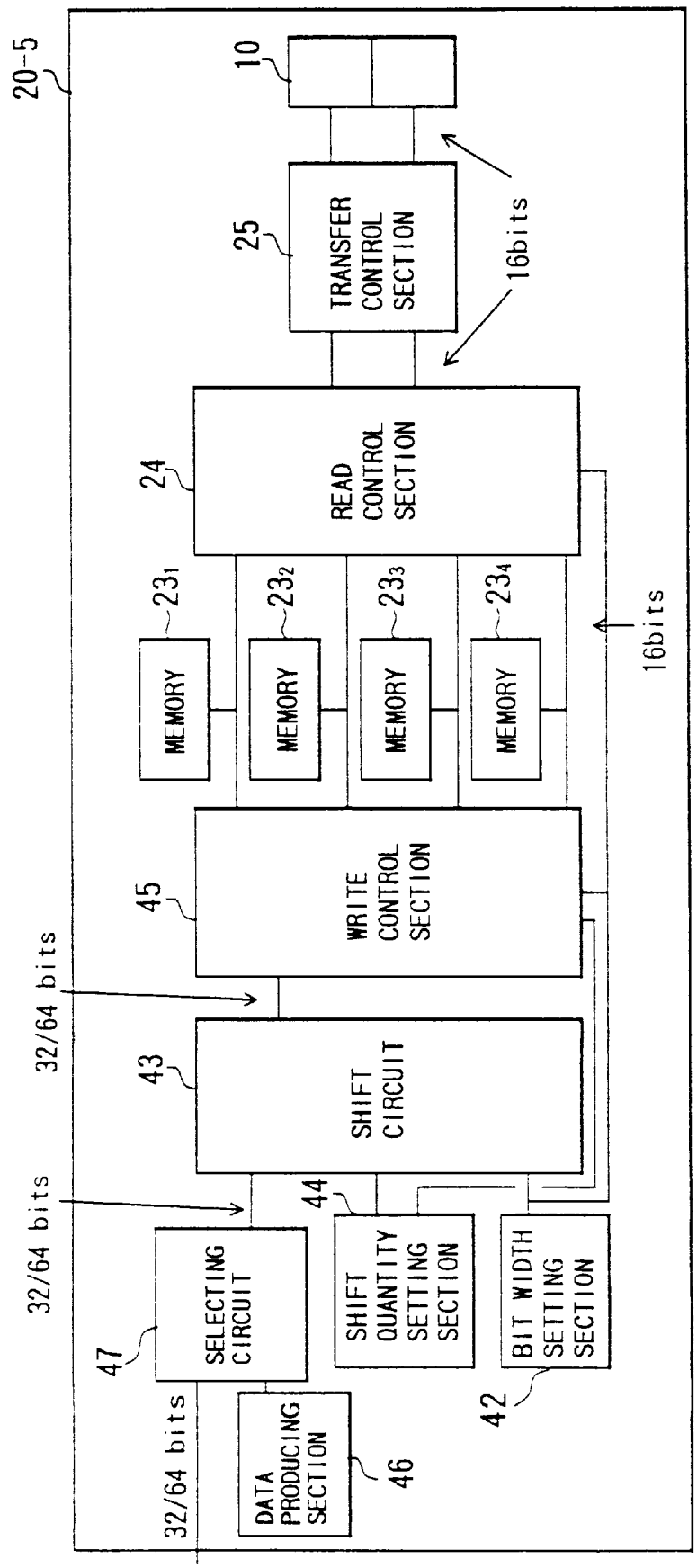
FIG. 17 is a block diagram showing the structure of an exposure device in accordance with a fifth embodiment of the present invention.

FIG. 17 shows the structure of an exposure device in accordance with a fifth embodiment of the present invention. As shown in the figure, an exposure device 20-5 according to the fifth embodiment is designed to add a data producing section 46 and a selecting circuit 47 to the exposure device according to the fourth embodiment.

The data producing section 46 produces image data according to an instruction given from the external device (not shown) and outputs the image data thus produced in a unit of 32 bits. The selecting circuit 47 supplies the image data from the external device to the shift circuit 43, or supplies the image data from the data producing section 46 to the shift circuit 43 in accordance with the instruction from the external device.

The exposure device 20-5 according to the fifth embodiment can print a test pattern.

(Sixth Embodiment)

Figure 18:
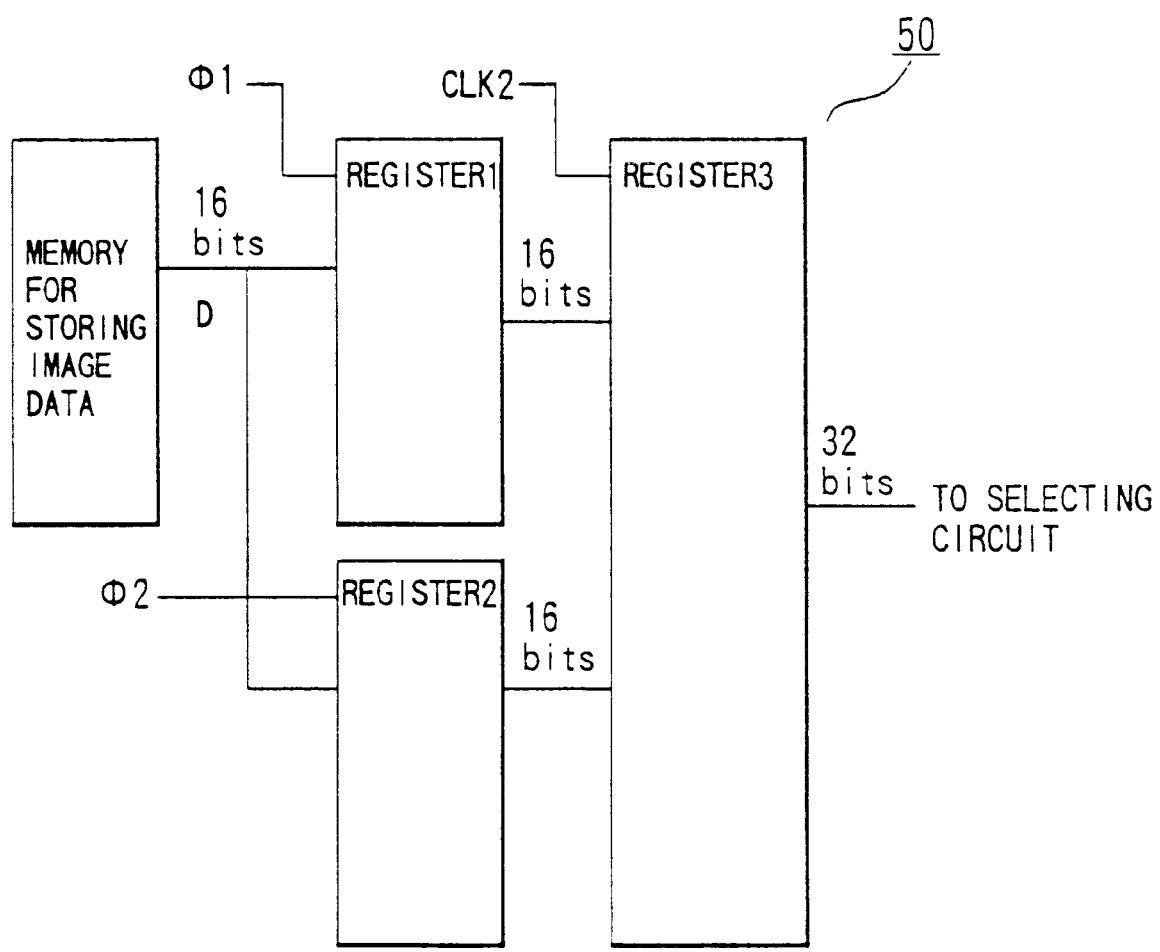
FIG. 18 is a diagram for explanation of a data producing section provided in an exposure device in accordance with a sixth embodiment of the present invention.

An exposure device according to a sixth embodiment is designed such that a data producing section 50 shown in FIG. 18 is connected thereto instead of the data producing section 46.

Figure 19:
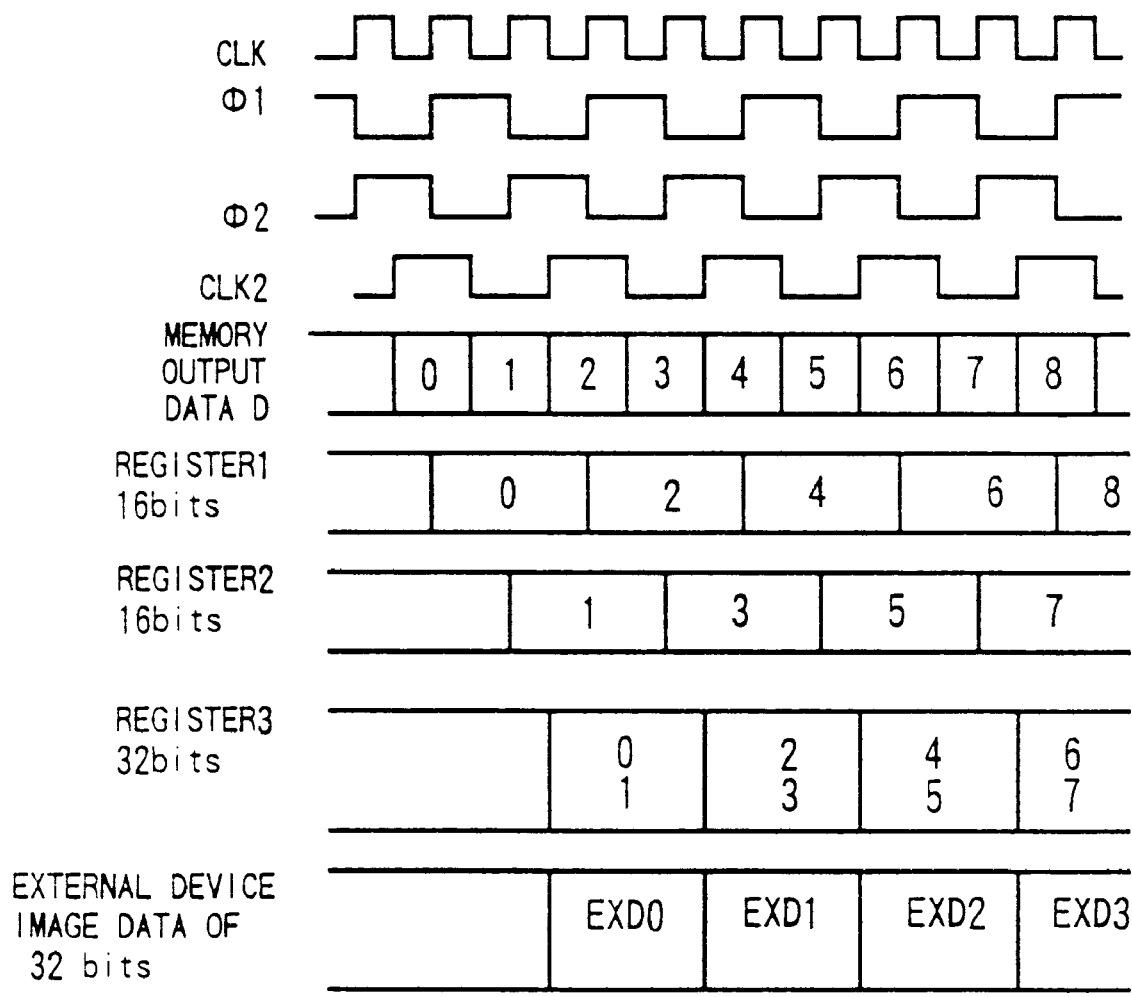
FIG. 19 is a timing chart for explanation of the operation of the data producing section provided in the exposure device in accordance with the sixth embodiment.

As shown in the figure, the data producing section 50 includes a memory for storing image data of 16 bits, two 16-bit registers and one 32-bit register. The image data produced within the data producing section 50 is stored in the memory. Then, in outputting the image data, two pieces of 16-bit data stored at continuous addresses in the memory are read by the registers 1 and 2 in accordance with the control of the respective registers 1 and 2 at a timing shown in FIG. 19. Then, the contents of those two registers are read by the register 3 and supplied to the select circuit 47 as the data of 32 bits.

With application of the image data producing section 50 thus structured, there can be formed an exposure device capable of printing a test pattern as in the exposure device of the fifth embodiment, relatively inexpensively.

(Seventh Embodiment)

Figure 20:
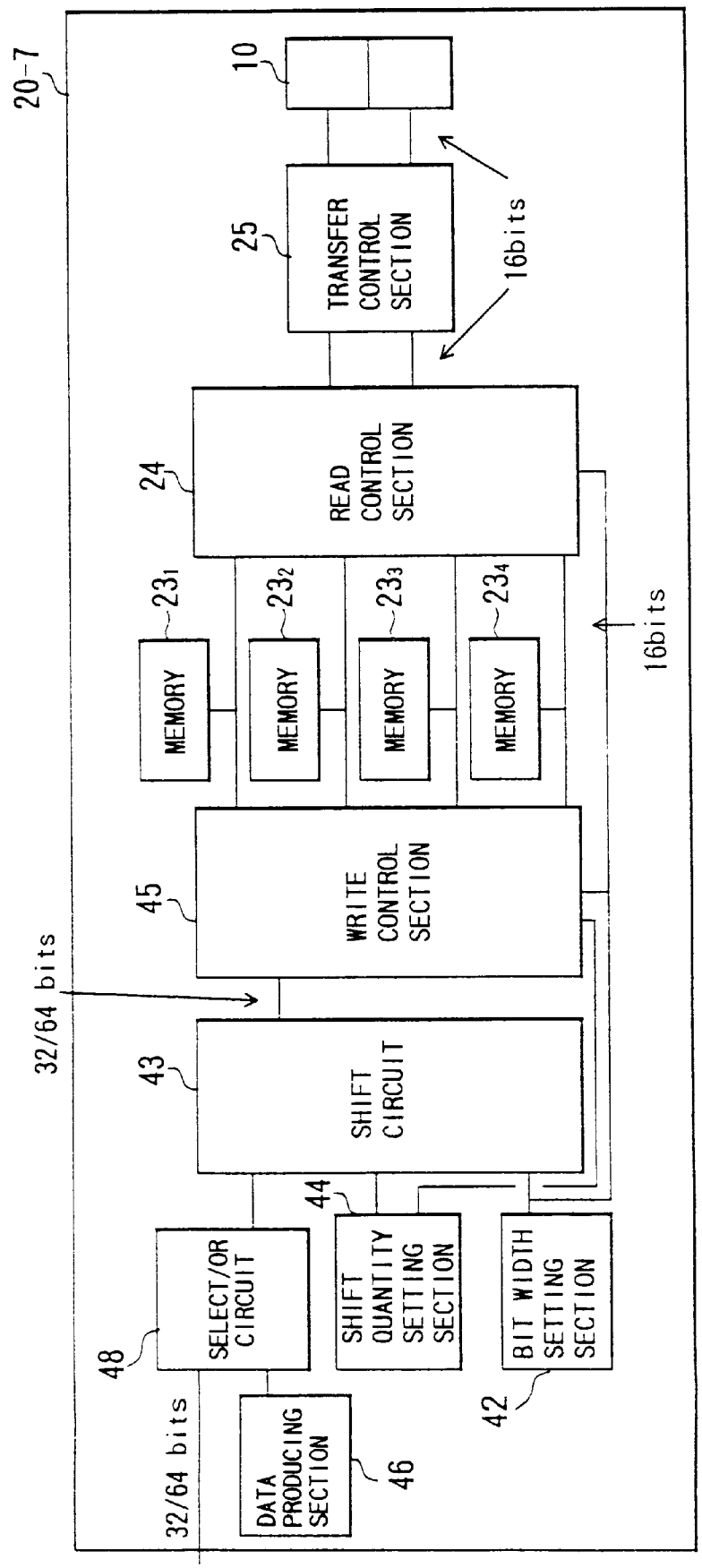
FIG. 20 is a block diagram showing the structure of an exposure device in accordance with a seventh embodiment of the present invention.

FIG. 20 shows the structure of an exposure device in accordance with a seventh embodiment of the present invention. As shown in the figure, an exposure device 20-7 according to the seventh embodiment includes a select/OR circuit 48 instead of the select circuit 47 in the exposure device of the fifth embodiment.

In accordance with the instruction from the external device, the select/OR circuit 48 supplies the image data from the external device to the shift circuit 43, supplies the image data from the data producing section 46 to the shift circuit 43, or outputs the image data obtained by logically summing the image data from the external device and the image data from the data producing section 46.

The exposure device 20-7 according to the seventh embodiment can include a mark pattern in the printing result in addition to printing of a test pattern.

(Eighth Embodiment)

Figure 21:
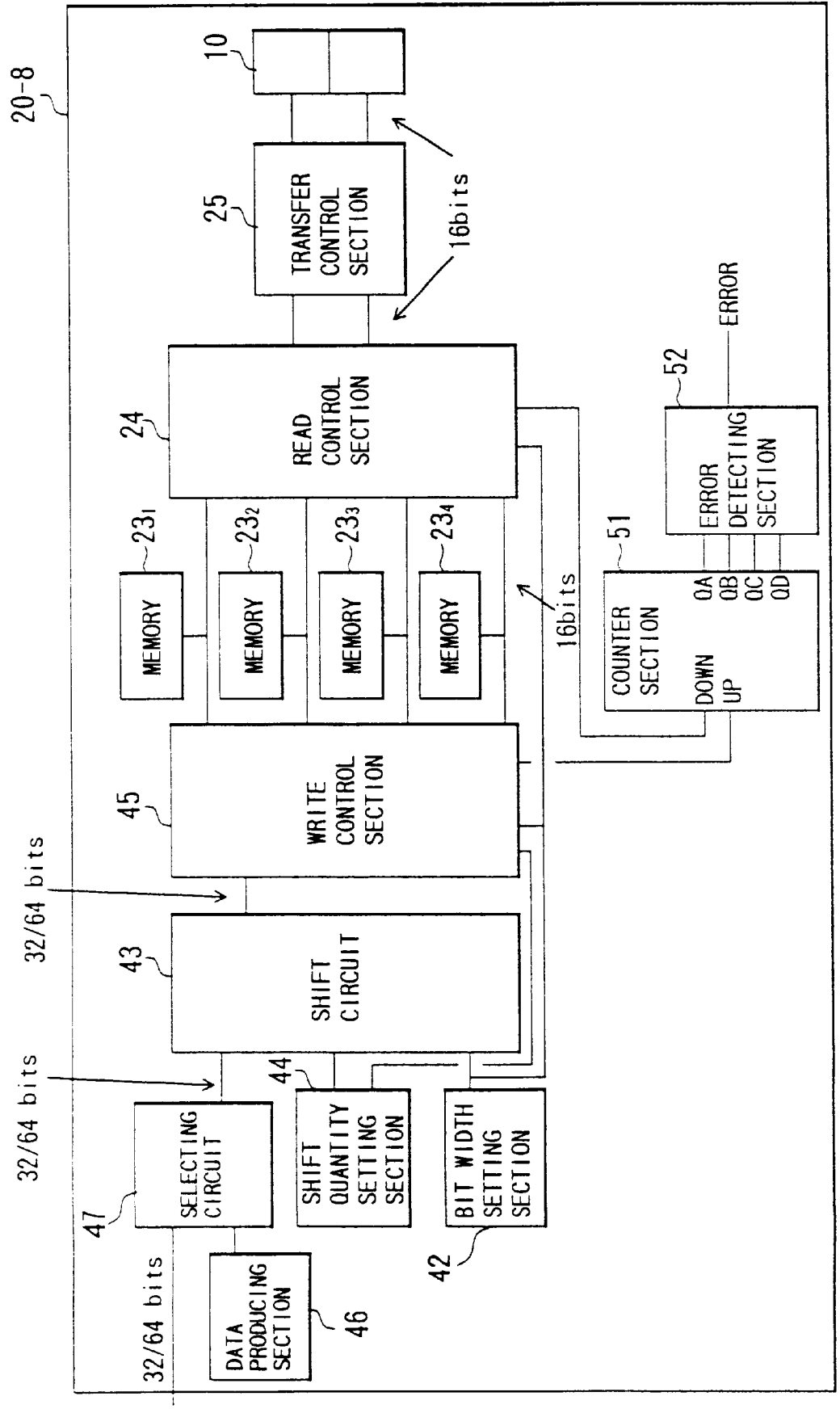
FIG. 21 is a block diagram showing the structure of an exposure device in accordance with an eighth embodiment of the present invention.

FIG. 21 shows the structure of an exposure device in accordance with an eighth embodiment of the present invention. As shown in the figure, an exposure device 20-8 of the eighth embodiment is designed to add a counter section 51 and an error detecting section 52 to the exposure device of the fifth embodiment.

Every time the write control section 45 writes data in any memory, the counter section 51 counts up a counter relating to each the memory held therein. Also, every time the read control section 24 reads data in any memory, the counter section 51 counts down, a counter relating to each the memory held therein. The error detecting section 52 checks a value of the counter for each memory when data processing for one page is completed, and outputs a signal indicating the occurrence of an error when there is any counter of the value other than "0".

In this way, since the exposure device 20-8 according to the eighth embodiment includes the error detecting section 53 for detecting the presence/absence of the occurrence of an error on the basis of a difference in the number of times of write/read accesses to the respective memories, the exposure device can be used in a state where reliability is high.

(Ninth Embodiment)

Figure 22:
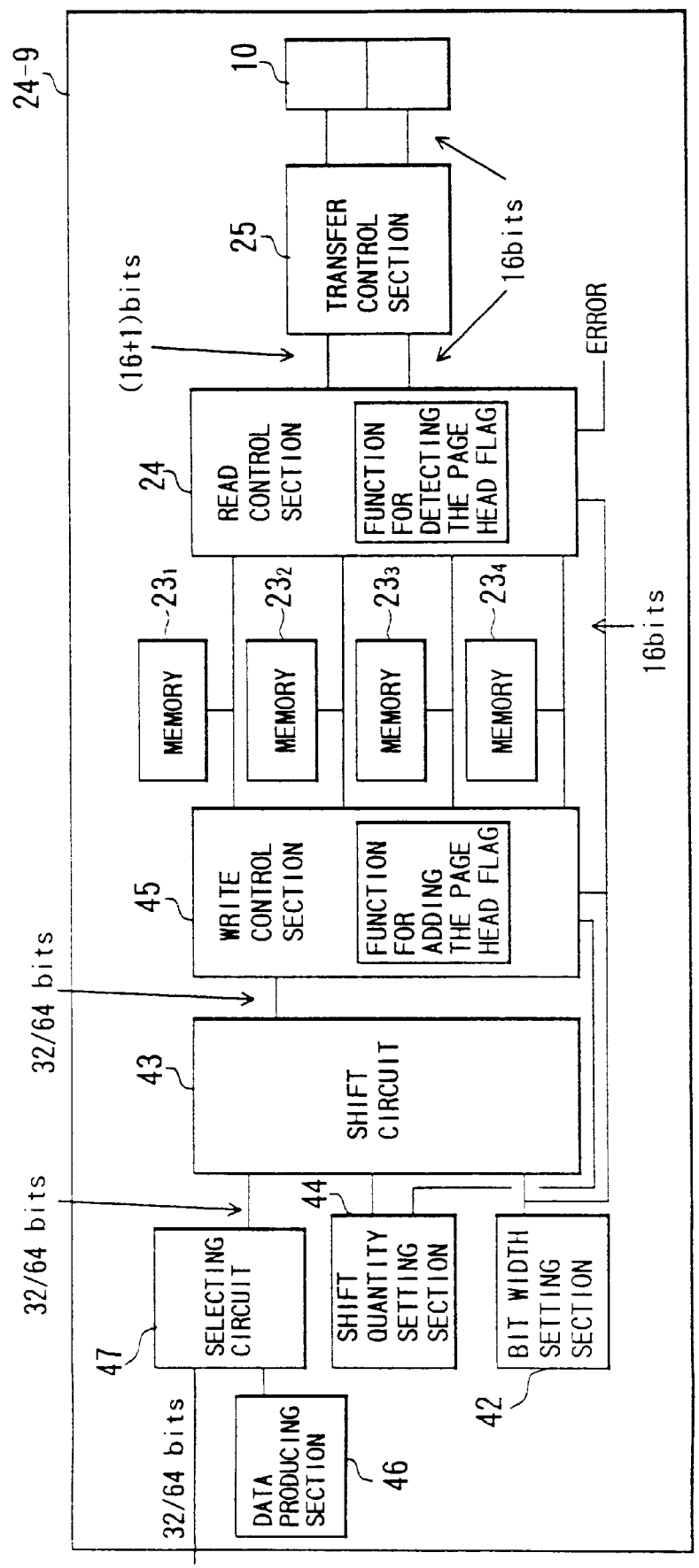
FIG. 22 is a block diagram showing the structure of an exposure device in accordance with a ninth embodiment of the present invention.
Figure 23:
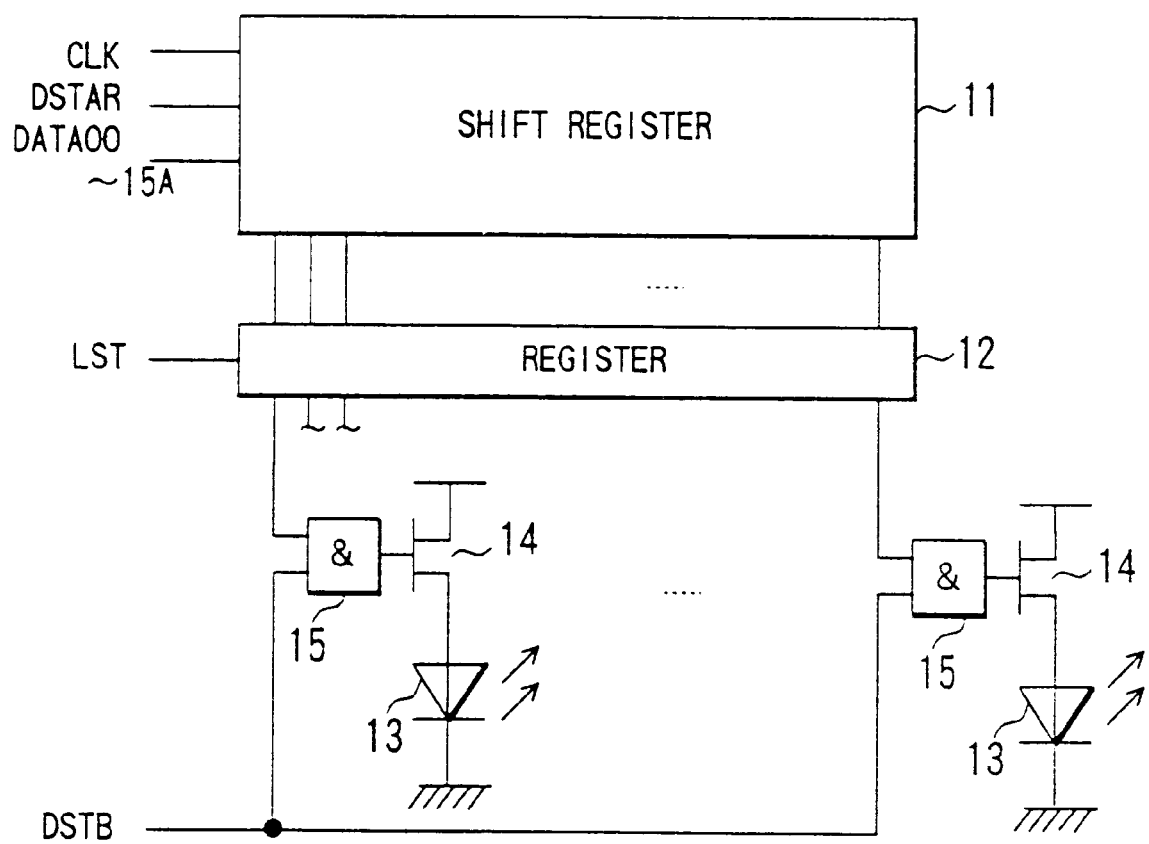
FIG. 23 is a diagram showing the structure of a conventional optical writing head.

FIG. 22 shows the structure of an exposure device in accordance with a ninth embodiment of the present invention. An exposure device 20-9 according to the ninth embodiment results from modifying the exposure device of the fifth embodiment, and as shown in the figure, the exposure device 20-9 includes a write control circuit 61 having a function of adding a page head flag instead of the write control section 45, and a read control circuit 62 having a function of detecting the flag instead of the read control section 24. Also, the exposure device 20-9 is designed to deliver data of "16+1" bits to the read control section 62 from the write control section 61 through the memory 23.

The function for adding the page head flag adds one bit of "1" to 16-bit data (of two pieces) relating to the head line of one page, and adds one bit of "0" to 16-bit data (of two pieces) relating to lines except the head line. Also, the function for detecting the page head flag checks whether "1" is added to data of 16 (+1) bits relating to the head line read from the memory, or not, and whether "0" is added to data of 16 bits relating to the lines except the head line. And the detecting function outputs a signal indicative of the occurrence of an error when a correct flag has not been added thereto.

In this way, since the exposure device 20-9 includes the function for detecting the presence/absence of the occurrence of an error by transferring data with a flag, the exposure device can be used in a high reliability state as in the exposure device 20-7.

(Modified Embodiment)

The exposure devices of the respective embodiments can be modified variously. For example, with the provision of a so-called RIP (Raster Image Processor), the exposure device may be the structure such that not only image data but also print data necessary for development can be received from the external device. Also, the exposure devices of the respective embodiments may be structured by use of the first optical write head 10' instead of the second optical write head 10', although a slightly severe limit is given to the circuit which supplies the image data to the optical write head 10'. Further, the bit width of data supplied to the optical writing head may be not 16 bits.

This invention being thus described, it will be obvious that same may be varied in various ways. Such variations are not to be regarded as departure from the spirit and scope of the invention, and all such modifications would be obvious for one skilled in the art intended to be included within the scope of the following claims.

What is claimed is:

1. An exposure device comprising:

a light emitting element array including (N×M) numbers of light emitting elements disposed linearly;

M numbers of data holding and outputting means for holding and outputting N numbers of pixel data, said M numbers of data holding and outputting means being adapted to shift the pixel data held therein and take supplied other pixel data when the other pixel data is supplied to said M numbers of pixel data holding and outputting means;

driving means for driving said (N×M) numbers of light emitting elements in said light emitting element array, simultaneously, according to the (N×M) numbers of pixel data outputted from said M numbers of data holding and outputting means when a stated control signal is inputted thereto;

shift quantity designating means for designating the quantity of shift;

storing means for storing pixel data contained in time-series image data as inputted;

data adding means for adding first non-emission pixel data perpendicular to a feeding direction of the number corresponding to the quantity of shift before the stored pixel data, every time a predetermined quantity of pixel data is stored in said storing means, said non-emission pixel data is pixel data relating to said light emission elements which do not emit the light; and dividing and supplying means for adding second non-emission pixel data after the pixel data to which the first non-emission pixel data has been added so that the total number of pixel data becomes (N×M), and supplies the (N×M) numbers of pixel data as obtained to said M numbers of data holding and outputting means N numbers by N numbers.

2. An exposure device as claimed in claim 1, wherein said M numbers of data holding and outputting means takes the pixel data in a unit of X bits (X is an integer); and wherein said dividing and supplying means supplies the pixel data in a unit larger than X bits to said data holding and outputting means.

3. An exposure device as claimed in claim 2, wherein said data holding and outputting means take the pixel data in a unit of X bits; and wherein said dividing and supplying means supplies the pixel data in a unit of (X×M) bits to said data holding and outputting means.

4. An exposure device as claimed in claim 1, wherein said dividing and supplying means supplies the pixel data by use of M numbers of dual-port memories which store at least (2×N) numbers of pixel data, in correspondence with said M numbers of data holding and outputting means, respectively.

5. An exposure device as claimed in claim 1, wherein said dividing and supplying means supplies the pixel data by use of M numbers of first memories that store at least N pixel data in correspondence with said M numbers of data holding and outputting means, respectively, and M numbers of second memories that store at least N pixel data in correspondence with said M numbers of data holding and outputting means, respectively.

6. An exposure device as claimed in claim 5, further comprising abnormality judging means which detects differences in the number between times of writing accesses and times of reading accesses of said M numbers of first memories and said M numbers of second memories, respectively, for judging the presence/absence of abnormality on the basis of the differences in the number of times as detected.

7. An exposure device as claimed in claim 1, further comprising developing means for developing data given from an external device to produce the pixel data and supply the pixel data to said dividing and supplying means.

8. An exposure device as claimed in claim 1, further comprising:
   image data storing means for storing image data; and
   image data superimposing means for obtaining a logical sum of the inputted time-series image data and said image data stored in the image data storing means to produce the pixel data and supply them to said dividing and supplying means.

\* \* \* \* \*